United States Patent
Zhang et al.

(10) Patent No.: US 11,606,821 B2
(45) Date of Patent: Mar. 14, 2023

(54) DOWNLINK TRANSMISSION INDICATION FOR RACH OCCASIONS

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 17/191,374

(22) Filed: Mar. 3, 2021

(65) Prior Publication Data
US 2022/0287097 A1 Sep. 8, 2022

(51) Int. Cl.
| H04W 4/00 | (2018.01) |
| H04W 74/08 | (2009.01) |
| H04L 5/14 | (2006.01) |
| H04W 72/04 | (2023.01) |
| H04W 72/0446 | (2023.01) |

(52) U.S. Cl.
CPC .......... *H04W 74/0833* (2013.01); *H04L 5/14* (2013.01); *H04W 72/042* (2013.01); *H04W 72/0446* (2013.01)

(58) Field of Classification Search
CPC .......... H04W 74/0833; H04W 72/042; H04W 72/0446; H04L 5/14
See application file for complete search history.

(56) References Cited

U.S. PATENT DOCUMENTS

| 2016/0165642 A1* | 6/2016 | Lundén ................ H04W 76/10 455/450 |
| 2020/0267764 A1 | 8/2020 | Rastegardoost et al. |
| 2020/0281018 A1* | 9/2020 | Li ........................ H04L 5/0051 |
| 2021/0029737 A1 | 1/2021 | Pan et al. |
| 2021/0029738 A1 | 1/2021 | Zhou et al. |
| 2021/0051672 A1* | 2/2021 | Rastegardoost .. H04W 72/0493 |
| 2021/0084687 A1* | 3/2021 | Liu .................. H04W 72/0446 |

FOREIGN PATENT DOCUMENTS

| EP | 3709757 A1 | 9/2020 |
| EP | 3742848 A1 | 11/2020 |
| WO | WO-2021064223 A1 * | 4/2021 .......... H04W 74/006 |

OTHER PUBLICATIONS

International Search Report and Written Opinion—PCT/US2022/070907—ISA/EPO—dated Jun. 17, 2022.

* cited by examiner

*Primary Examiner* — Siren Wei
(74) *Attorney, Agent, or Firm* — Patterson + Sheridan, LLP

(57) ABSTRACT

Certain aspects of the present disclosure provide techniques for indicating an overlap of downlink transmissions with one or more random access channel occasions (ROs). A method that may be performed by a user equipment (UE) includes receiving signaling from a base station (BS) including an indication of whether one or more ROs will overlap with downlink transmissions in one or more periods of time, transmitting, to the BS based on the indication, a random access channel (RACH) preamble in an RO of the one or more ROs during the one or more periods of time, and performing a RACH procedure with the BS based on the transmitted RACH preamble.

29 Claims, 10 Drawing Sheets

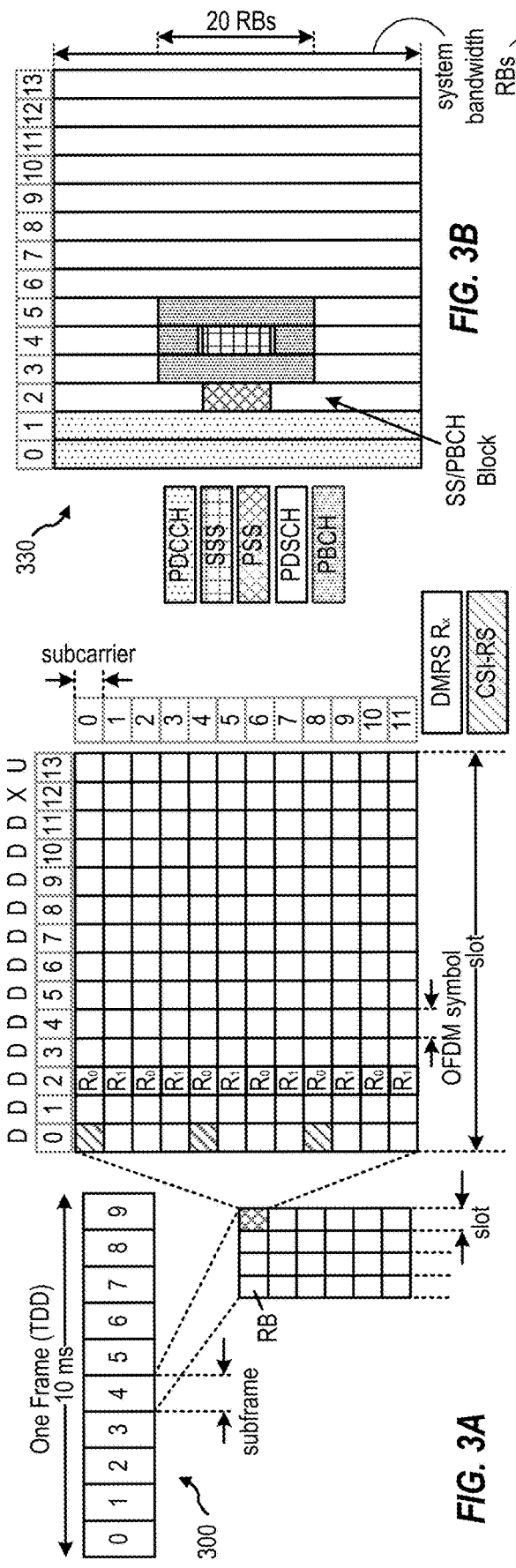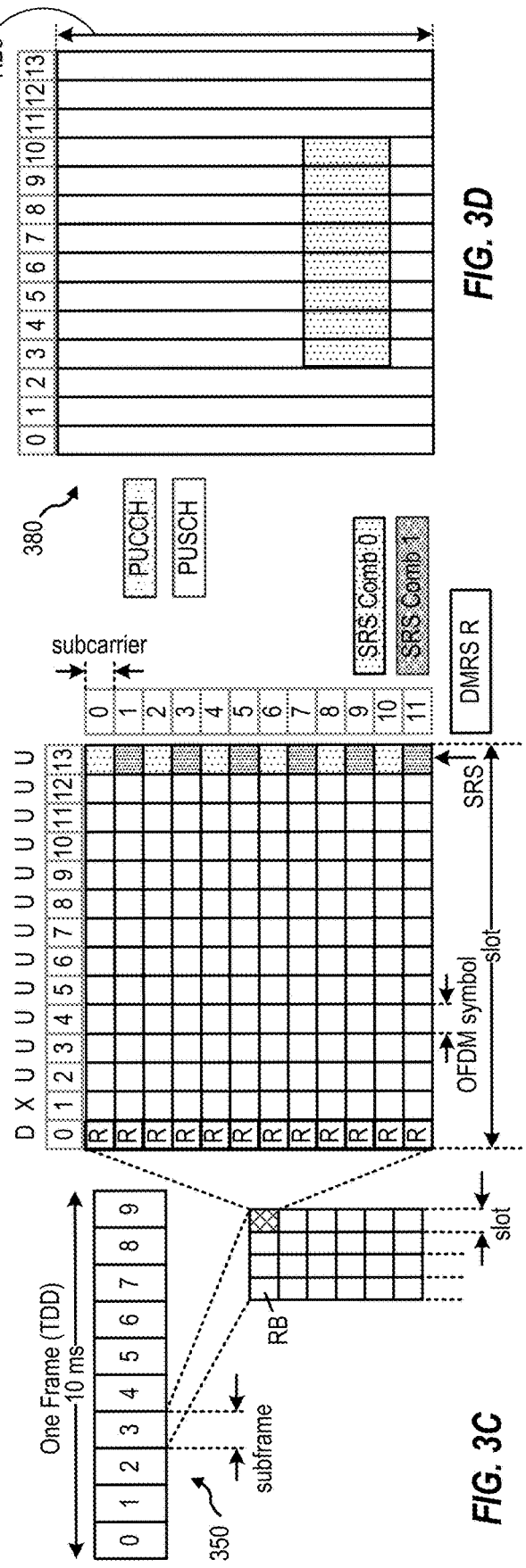

DOWNLINK TRANSMISSION INDICATION FOR RACH OCCASIONS

INTRODUCTION

Aspects of the present disclosure relate to wireless communications, and more particularly, to techniques for indicating an overlap of downlink transmissions with one or more random access channel occasions.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, such challenges may include challenges related to selecting random access channel (RACH) occasions (ROs) for accessing the wireless communication systems. Consequently, there exists a need for further improvements in wireless communications systems to overcome various challenges.

SUMMARY

Certain aspects can be implemented in a method for wireless communication performed by a user equipment (UE). The method generally includes receiving signaling from a base station (BS) including an indication of whether one or more random access channel occasions (ROs) will overlap with downlink transmissions in one or more periods of time; transmitting, to the BS based on the indication, a random access channel (RACH) preamble in an RO of the one or more ROs during the one or more periods of time; and performing a RACH procedure with the BS based on the transmitted RACH preamble.

Certain aspects can be implemented in an apparatus for wireless communication by a user equipment (UE). The apparatus may include a memory and a processor coupled to the memory, the memory and the processor being configured to: receive signaling from a base station (BS) including an indication of whether one or more random access channel occasions (ROs) will overlap with downlink transmissions in one or more periods of time; transmit, to the BS based on the indication, a random access channel (RACH) preamble in an RO of the one or more ROs during the one or more periods of time; and perform a RACH procedure with the BS based on the transmitted RACH preamble.

Certain aspects can be implemented in an apparatus for wireless communication by a user equipment (UE). The apparatus may include means for receiving signaling from a base station (BS) including an indication of whether one or more random access channel occasions (ROs) will overlap with downlink transmissions in one or more periods of time; means for transmitting, to the BS based on the indication, a random access channel (RACH) preamble in an RO of the one or more ROs during the one or more periods of time; and means for performing a RACH procedure with the BS based on the transmitted RACH preamble.

Certain aspects can be implemented in a non-transitory computer-readable medium for wireless communication by a user equipment (UE). The non-transitory computer-readable medium may comprise computer-executable instructions that, when executed by one or more processors of a processing system, cause the processing system to: receive signaling from a base station (BS) including an indication of whether one or more random access channel occasions (ROs) will overlap with downlink transmissions in one or more periods of time; transmit, to the BS based on the indication, a random access channel (RACH) preamble in an RO of the one or more ROs during the one or more periods of time; and perform a RACH procedure with the BS based on the transmitted RACH preamble.

Certain aspects can be implemented in a computer program product for wireless communication by a user equipment (UE) embodied on a computer-readable storage medium. The computer-readable storage medium may comprise code for receiving signaling from a base station (BS) including an indication of whether one or more random access channel occasions (ROs) will overlap with downlink transmissions in one or more periods of time, transmitting, to the BS based on the indication, a random access channel (RACH) preamble in an RO of the one or more ROs during the one or more periods of time, and performing a RACH procedure with the BS based on the transmitted RACH preamble.

Certain aspects can be implemented in a method for wireless communication performed by a base station (BS). The method generally includes transmitting signaling to a user equipment (UE) including an indication of whether one or more random access channel occasions (ROs) will overlap with downlink transmissions in one or more periods of time; receiving, from the UE based on the indication, a random access channel (RACH) preamble in an RO of the one or more ROs during the one or more periods of time; and performing a RACH procedure with the UE based on the received RACH preamble.

Certain aspects can be implemented in an apparatus for wireless communication by a base station (BS). The apparatus may include a memory and a processor coupled to the memory, the memory and the processor being configured to: transmit signaling to a user equipment (UE) including an indication of whether one or more random access channel occasions (ROs) will overlap with downlink transmissions in one or more periods of time; receive, from the UE based on the indication, a random access channel (RACH) preamble in an RO of the one or more ROs during the one or more periods of time; and perform a RACH procedure with the UE based on the received RACH preamble.

Certain aspects can be implemented in an apparatus for wireless communication by a base station (BS). The apparatus may include means for transmitting signaling to a user equipment (UE) including an indication of whether one or more random access channel occasions (ROs) will overlap with downlink transmissions in one or more periods of time; means for receiving, from the UE based on the indication, a random access channel (RACH) preamble in an RO of the one or more ROs during the one or more periods of time; and means for performing a RACH procedure with the UE based on the received RACH preamble.

Certain aspects can be implemented in a non-transitory computer-readable medium for wireless communication by a base station (BS). The non-transitory computer-readable medium may comprise computer-executable instructions that, when executed by one or more processors of a processing system, cause the processing system to: transmit signaling to a user equipment (UE) including an indication of whether one or more random access channel occasions (ROs) will overlap with downlink transmissions in one or more periods of time; receive, from the UE based on the indication, a random access channel (RACH) preamble in an RO of the one or more ROs during the one or more periods of time; and perform a RACH procedure with the UE based on the received RACH preamble.

Certain aspects can be implemented in a computer program product for wireless communication by a base station (BS) embodied on a computer-readable storage medium. The computer-readable storage medium may comprise code for: transmitting signaling to a user equipment (UE) including an indication of whether one or more random access channel occasions (ROs) will overlap with downlink transmissions in one or more periods of time; receiving, from the UE based on the indication, a random access channel (RACH) preamble in an RO of the one or more ROs during the one or more periods of time; and performing a RACH procedure with the UE based on the received RACH preamble Other aspects provide apparatuses configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and an apparatus comprising means for performing the aforementioned methods as well as those further described herein.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A, 3B, 3C, and 3D depict various example aspects of data structures for a wireless communication network.

The following description and the appended figures set forth certain features for purposes of illustration.

DETAILED DESCRIPTION

Aspects of the present disclosure provide apparatuses, methods, processing systems, and computer-readable mediums for indicating an overlap of downlink transmissions with one or more random access channel occasions. For example, user equipments (UEs) may perform random access channel (RACH) procedures for various reasons, such as establishing an initial connection with a network, updating a time advance (TA), performing a beam recovery procedure, and the like. To initiate a RACH procedure, a UE may transmit a RACH preamble within a RACH occasion (RO). ROs are generally predefined periods in time in which UEs may transmit RACH preambles to a BS.

In current 5G new radio (NR) systems, ROs may not overlap with other downlink transmissions, which may increase latency associated with performing RACH procedures. These ROs may be known as half-duplex (HD) ROs. However, to provide UEs with more flexibility and to help reduce latency associated with RACH procedures, UEs may use ROs that do overlap with other downlink transmissions. These types of ROs may be known as full-duplex (FD) ROs.

In some cases, a UE may select between HD ROs and FD ROs for performing a RACH procedure based on one or more criteria involving at least one of transmission latency or transmission reliability. For example, if the UE is close to the center of a cell with good channel conditions, the UE may decide to use an FD RO to perform a RACH procedure to reduce latency associated with the RACH procedure. In other cases, if the UE is close to an edge of the cell with poorer channel conditions, the UE may instead decide to use an HD RO to perform a RACH procedure to improve the chances that RACH transmissions from the UE are properly received by a BS (e.g., since these RACH transmissions would not be overlapped by other DL transmissions during the HD RO).

Accordingly, the techniques presented herein provide the UE with flexibility to choose reliability (e.g., by using HD ROs) or reduced latency (e.g., by using FD ROs) when performing RACH procedures. The use of FD ROs to reduce latency may also lead to additional benefits, such as a reduction in power consumption at the UE, better use of finite wireless resources, more data throughput, and the like.

Introduction to Wireless Communication Networks

Figure 1:
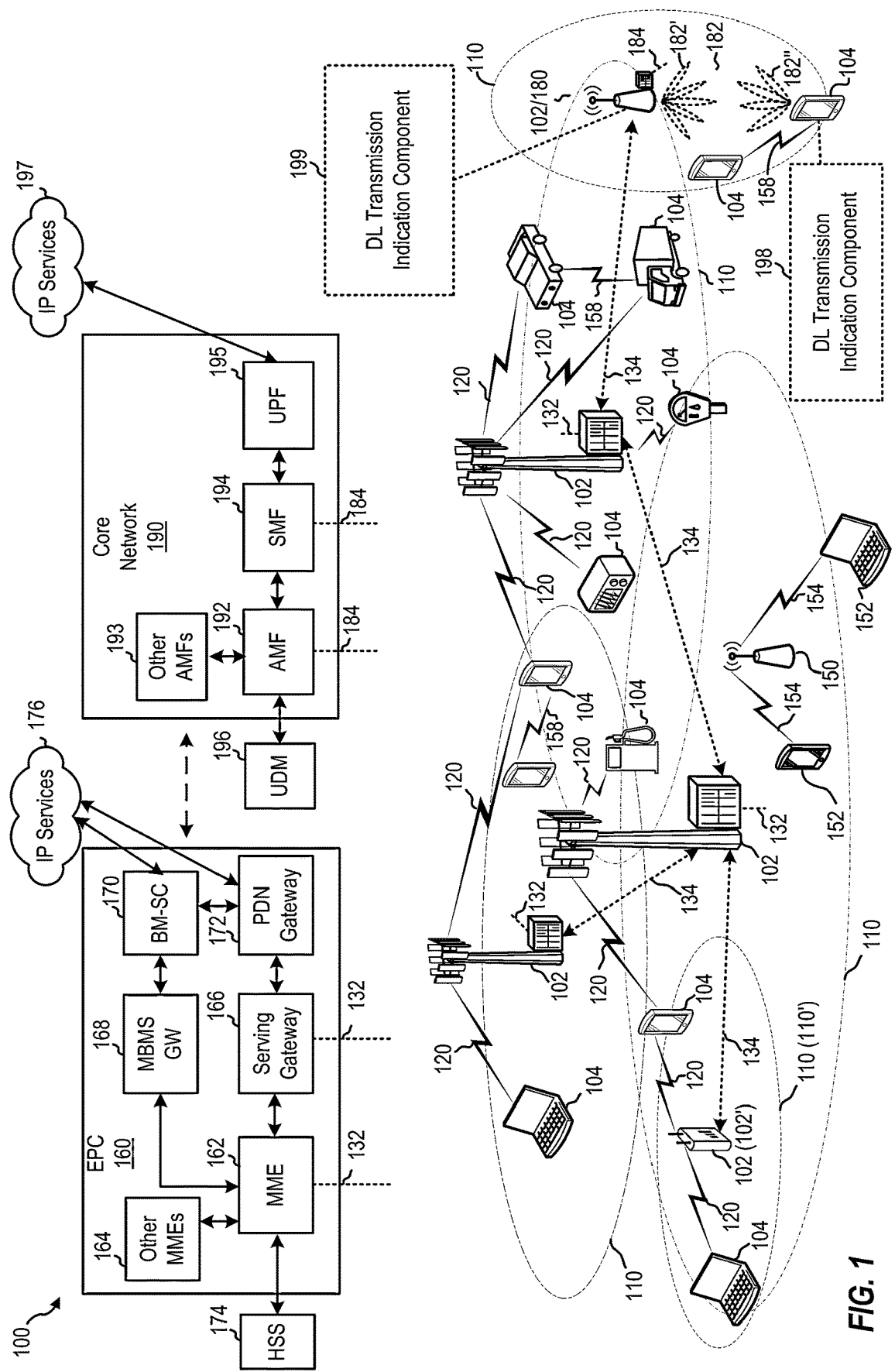
FIG. 1 is a block diagram conceptually illustrating an example wireless communication network.

FIG. 1 depicts an example of a wireless communication network 100, in which aspects described herein may be implemented.

Generally, wireless communication network 100 includes base stations (BSs) 102, user equipments (UEs) 104, an Evolved Packet Core (EPC) 160, and core network 190 (e.g., a 5G Core (5GC)), which interoperate to provide wireless communications services.

Base stations 102 may provide an access point to the EPC 160 and/or core network 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, Node B, eNB, an access point, a base transceiver station, a radio base station, a radio transceiver, or a transceiver function, or a transmit reception point (TRP) in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Figure 6:
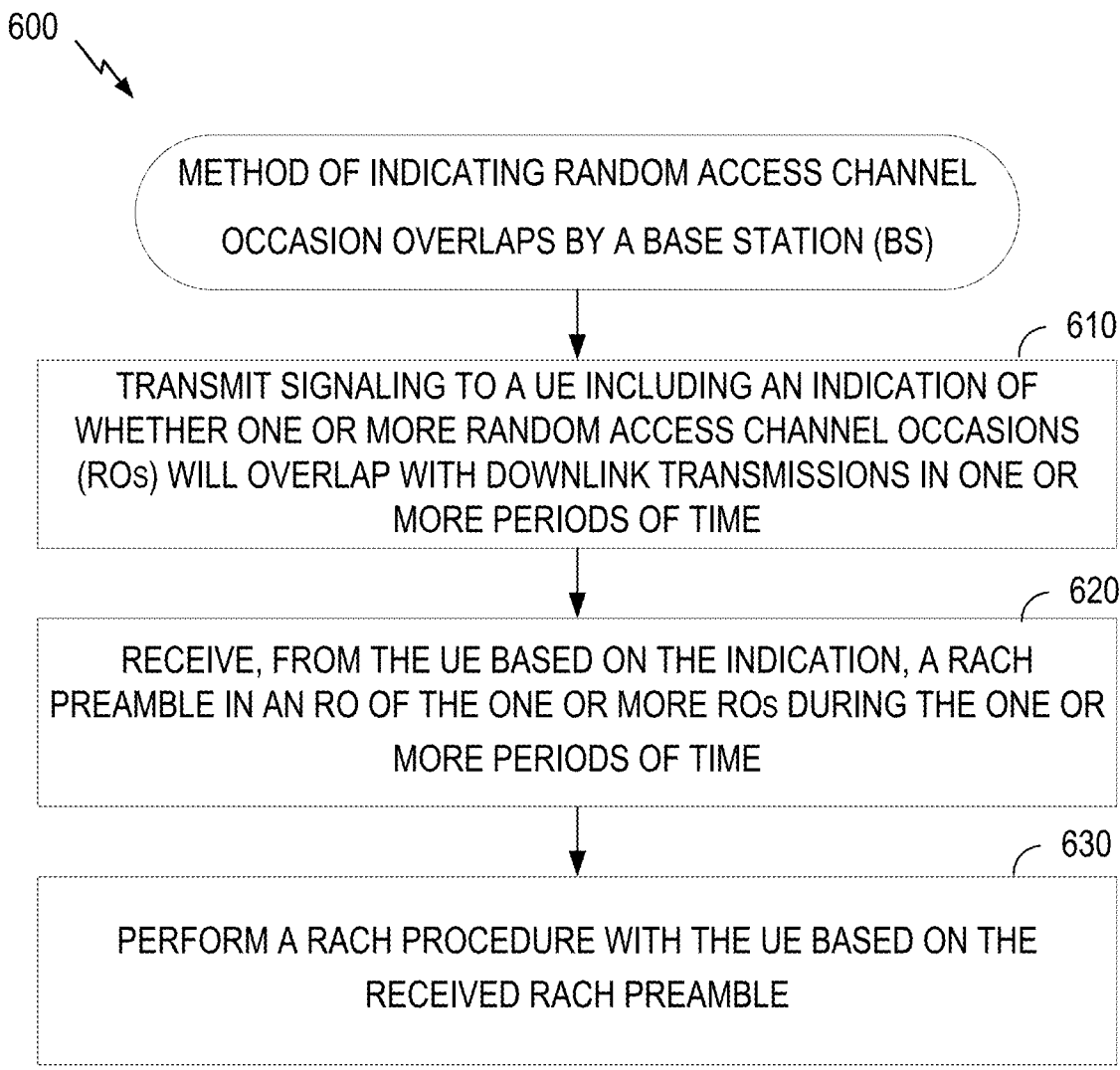
FIG. 6 is a flow diagram illustrating example operations for wireless communication by a base station.

Wireless communication network 100 includes a downlink (DL) transmission indication component 199, which may be configured to perform the operations illustrated in FIGS. 6 and/or 8, as well as other operations described herein for indicating an overlap of downlink transmissions with one or more random access channel occasions. Wireless communication network 100 further includes DL transmission indication component 198, which may be used configured to perform the operations illustrated in FIGS. 7-8, as well as other operations described herein for indicating an overlap of downlink transmissions with one or more random access channel occasions.

Figure 2:
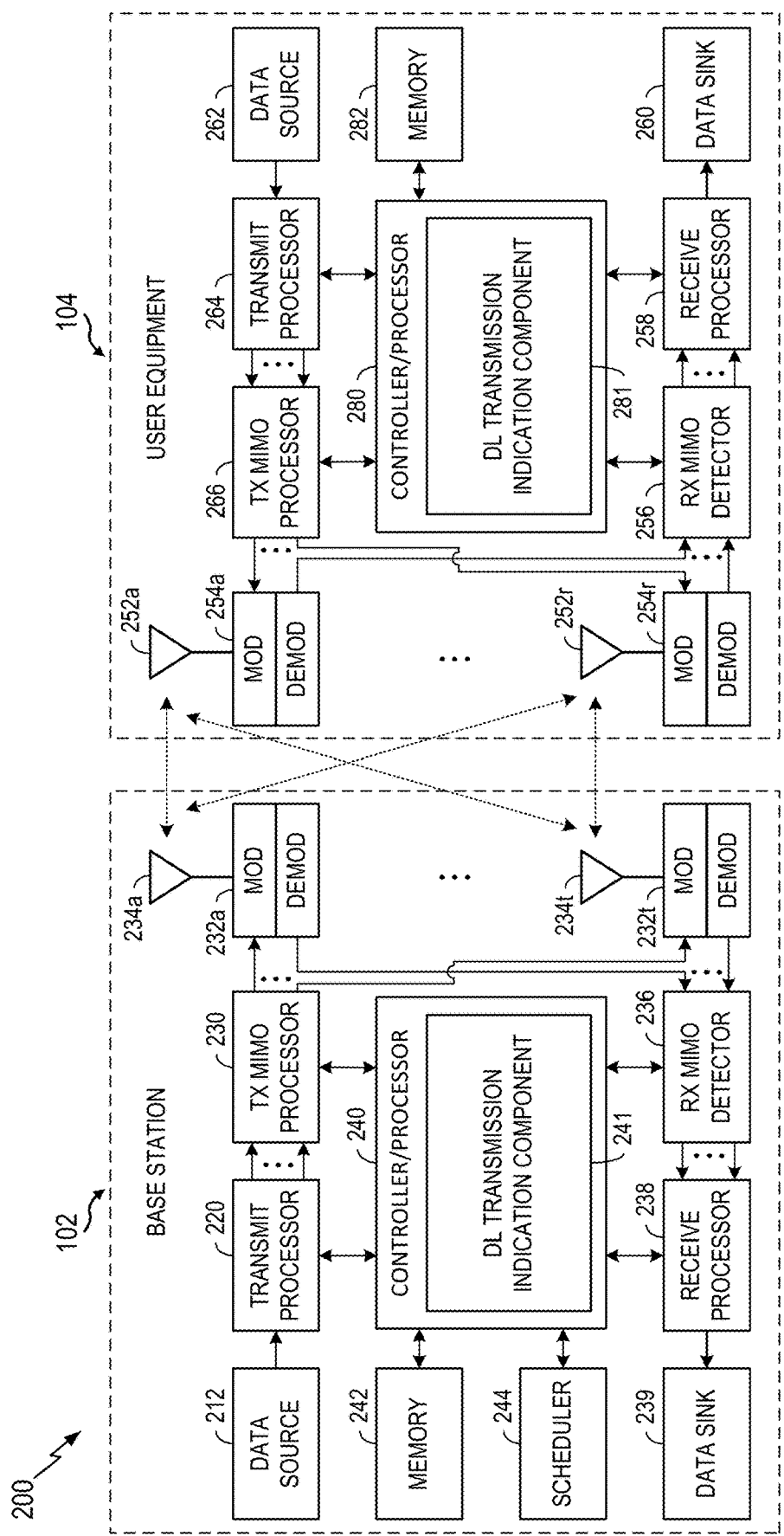
FIG. 2 is a block diagram conceptually illustrating aspects of an example base station and user equipment.

FIG. 2 depicts aspects of an example base station (BS) 102 and a user equipment (UE) 104.

Generally, BS 102 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., source data 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes DL transmission indication component 241, which may be representative of DL transmission indication component 199 of FIG. 1. Notably, while depicted as an aspect of controller/processor 240, DL transmission indication component 241 may be implemented additionally or alternatively in various other aspects of BS 102 in other implementations.

Generally, UE 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes DL transmission indication component 281, which may be representative of DL transmission indication component 198 of FIG. 1. Notably, while depicted as an aspect of controller/processor 280, DL transmission indication component 281 may be implemented additionally or alternatively in various other aspects of UE 104 in other implementations.

FIGS. 3A, 3B, 3C, and 3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A, 3B, 3C, and 3D are provided later in this disclosure.

Introduction to mmWave Wireless Communications

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" ("mmW" or "mmWave") band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmWave/near mmWave radio frequency band (e.g., 3 GHz-300 GHz) may have higher path loss and a shorter range compared to lower frequency communications. Accordingly, in FIG. 1, mmWave BS 180 may utilize beamforming 182 with the UE 104 to improve path loss and range. To do so, BS 180 and the UE 104 may each include a plurality of antennas, such as antenna elements, antenna panels, and/or antenna arrays to facilitate the beamforming.

In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the base station 180 in one or more transmit directions 182". Base station 180 may receive the beamformed signal from UE 104 in one or more receive directions 182'. Base station 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

In certain aspects, a wireless device, such as a BS, UE, integrated backhaul and access network (IAB-network) node (IAB-node) that supports a mobile telecommunication (MT) function, etc., may be capable of transmit/receive (Tx/Rx) beam correspondence. Beam correspondence relates to receive (Rx) beams and transmit (Tx) beams which are spatial beams for receiving and transmitting signals formed by beamforming by a wireless device.

Beam correspondence may mean that a Tx beam may be used to determine a corresponding Rx beam or an Rx beam may be used to determine a corresponding Tx beam for wireless communications. As discussed, a UE and BS may each be capable of beamforming for both receiving and transmitting wireless signals. Accordingly, each of the UE and BS may receive signals directionally over one or more respective Rx beams (referred to as UE Rx beams for the UE and BS Rx beams for the BS), and each of the UE and BS may transmit signals directionally over one or more respective Tx beams (referred to as UE Tx beams for the UE and BS Tx beams for the BS). In certain aspects, beam correspondence as discussed herein corresponds to beam correspondence as defined in 3GPP TR 38.802.

For example, a BS is capable of Tx/Rx beam correspondence if at least one of the following conditions is satisfied: 1) a BS is able to determine a BS Rx beam for uplink reception based on a UE's downlink measurement of one or more BS Tx beams; or 2) a BS is able to determine a BS Tx beam for downlink transmission based on the BS's uplink measurement on one or more BS Rx beams.

Further, a UE is capable of Tx/Rx beam correspondence if at least one of the following is satisfied: 1) a UE is able to determine a UE Tx beam for uplink transmission based on the UE's downlink measurement on one or more UE Rx beams; or 2) a UE is able to determine a UE Rx beam for downlink reception based on a BS's uplink measurement of one or more UE Tx beams.

In certain aspects, a UE may report its beam correspondence capability to a BS upon receiving an explicit request from the BS such as described in 3GPP TS 38.331. The BS may then select different beam management approaches based on a UE's reported capability.

Introduction to Multi-Antenna Panel Communication

In certain systems, such as the wireless communication network 100 of FIG. 1, UEs and BSs may be able to transmit or receive transmissions using multiple antennas, beams, and/or antenna panels (e.g., antenna element arrays). An antenna panel may comprise a collection of transceiver units (TXRUs) that are capable of generating an analog beam. In some cases, when a dual-polarized array is used, the one beam may correspond to two antenna ports. In some cases, same sets or different sets of antenna panels can be used for DL reception and UL transmission. For example, in some cases, the same set of antenna panels may be used for both DL reception and UL transmission while in other cases different sets of antenna panels could be used for DL reception as compared to UL transmission.

Additionally, antenna panels can be associated with the same as well as different numbers of antenna ports, a number of beams, and/or an effective isotropic radiated power (EIRP). In some cases, while different antenna panels may share a same number of beams, there may not be beam correspondence across different antenna panels. Further, in some cases, each antenna panel may be associated with the same or independent operation parameters, such as power control (PC) parameters, a fast Fourier transform timing window, a time advance (TA) parameter, and the like. Additionally, each antenna panel of the UE may be associated with a particular panel identifier (ID) or an antenna panel group ID. In some cases, the antenna panel ID or antenna panel group ID may include one or more of a beam group ID, a transmission configuration indicator (TCI) state pool ID, a sounding reference signal (SRS) resource group ID, a control resource set (CORESET) pool ID, or a closed loop power control index.

In some cases, the capability to perform transmissions using multiple panels may be especially useful for higher frequency transmission, such as millimeter wave transmissions described above. In some cases, the transmissions associated with a UE may be received from or transmitted to a serving BS or transmission reception point (TRP) via a Uu interface. Generally, transmissions using multiple antenna panels may allow for increased throughput (e.g., by simultaneously or concurrently transmitting/receiving data to/from the BS using the multiple antenna panels) and/or increased reliability (e.g., by sending/receiving the same information using the multiple antenna panels). Such transmissions may be referred to as multi-panel transmissions.

Aspects Related to Downlink Transmission Indication for RACH Occasions

As noted above, in some cases, wireless communication devices, such as UEs and BSs, may communicate using multiple antenna panels. In some cases, the multiple antenna panels may be used for half-duplex (HD) communication, such as in current 5G new radio (NR) communication systems, in which downlink (DL) and uplink (UL) transmissions are transmitted non-simultaneously (e.g., transmitted in different time resources). HD communication may be considered baseline behavior in Release 15 (R-15) and 16 (R-16) of 5G NR. In other cases, the use of multiple antenna panels may allow for full duplex (FD) communication whereby uplink (UL) and downlink (DL) transmissions may be performed simultaneously (e.g., in the same time resources). For example, in some cases, UL transmission by the UE may be performed on one panel while DL reception may be performed simultaneously on another panel of the UE. Likewise, at a BS, DL transmission by the BS may be performed on one antenna panel while UL reception may be performed on another antenna panel.

FD capability may be conditioned on beam separation (e.g., frequency separation or spatial separation) and may still be subject to certain self-interference between UL and DL (e.g., UL transmission directly interferes with DL reception) as well as clutter echo (e.g., where UL transmission echoes affect UL transmission and/or DL reception). However, while FD capability may be subject to certain interference, FD capability provides for reduced transmission and reception latency (e.g., it may be possible to receive DL transmissions in an UL-only slot), increased spectrum efficiency (e.g., per cell and/or per UE), and more efficient resource utilization.

Figure 4A:
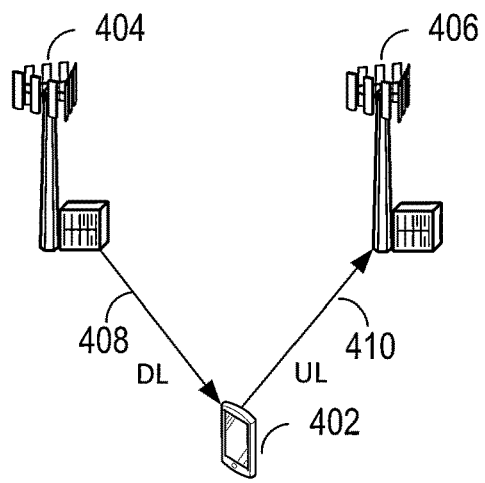
FIGS. 4A, 4B, and 4C illustrate different full-duplex use cases within a wireless communication network.
Figure 4B:
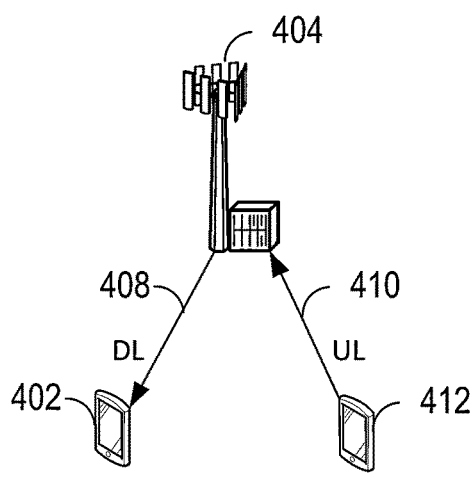
Figure 4C:
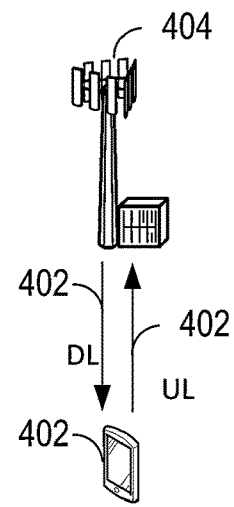

FIGS. 4A, 4B, and 4C illustrate different FD use cases within a wireless communication network, such as the wireless communication network 100. For example, FIG. 4A illustrates a first FD use case involving transmission between one UE 402 and two base stations (or multiple transmission reception points (mTRP)), BS 404 and BS 406. In some cases, UE 402 may be representative of UE 104 of FIG. 1 and BSs 404, 406 may be representative of BS 102 of FIG. 1. As shown, the UE 402 may simultaneously receive DL transmissions 408 from the BS 404 and transmit UL transmissions 410 to the BS 406. In some cases, the DL transmissions 408 and UL transmissions 410 may be performed using different antenna panels to facilitate the simultaneous transmission and reception.

A second FD use case is illustrated in FIG. 4B involving two different UEs and one BS. As illustrated, the UE 402 may receive DL transmissions 408 from the BS 404 while another UE 412 may simultaneously transmit UL transmission 410 to the BS 404. Thus, in this example, BS 404 is conducting simultaneous uplink and downlink communications.

A third FD use case is illustrated in FIG. 4C involving one BS and one UE. As illustrated, the UE 402 may receive DL transmissions 408 from the BS 404 and may simultaneously transmit UL transmissions 410 to the BS 404. As noted above, such simultaneous reception/transmission by the UE 402 may be facilitated by different antenna panels.

Table 1, below, illustrates various example scenarios in which each of the FD use cases may be used.

TABLE 1

| Base Station | UE | FD use case |
| --- | --- | --- |
| FD disabled | FD disabled | Baseline R-15/16 5G behavior |
| FD disabled | FD enabled | Use case #1 (FIG. 4A) for mTRP |
| FD enabled | FD disabled | Use case #2 (FIG. 4B) + R-16 IAB |
| FD enabled | FD enabled | Use case #3 (FIG. 4C) |

As shown, if FD capability is disabled at both the base station and UE, the baseline R-15 and R-16 5G behavior may be used (e.g., HD communication). If FD capability is disabled at the BS but enabled at the UE, the UE may operate according to the first example FD use case shown in FIG. 4A in which the UE may communicate with two different TRPs simultaneously (e.g., simultaneous UL and DL transmissions) using two different antenna panels. If FD is enabled at the BS but disabled at the UE (e.g., the UE is not capable of FD), the BS may operate according to the second example FD use case shown in FIG. 4B in which the BS may communicate with two different UEs simultaneously (e.g., simultaneous UL and DL transmissions) using two different antenna panels. Finally, if FD is enabled at both the BS and the UE, the BS and UE may operate according to the third example FD use case shown in FIG. 4C in which the BS and UE may communicate with each other simultaneously on the UL and DL, each of the BS and UE using different antenna panels for UL and DL transmissions.

FD communication may be facilitated through the use of frequency division multiplexing (FDM) or spatial division multiplexing (SDM). In FDM, the simultaneous UL and DL transmissions may be transmitted in the same time resources but on separate frequency bands separated by some guard band. In SDM, the simultaneous UL and DL transmissions may transmitted on the same time and frequency resources but spatially separated into different, directional transmission beams. Such FD communication contrasts with HD communication that uses time division multiplexing (TDM) in which UL and DL transmissions are scheduled on the same or different frequency resources, but different time resources.

In current 5G NR communication systems, UEs use a HD mode exclusively for performing random access channel (RACH) procedures with a BS. Generally, RACH procedures may be used by the UE for one or more purposes, such as establishing an initial connection with a network, updating a time advance (TA) in connected mode, performing a beam recovery procedure in connected mode, and the like.

To begin a RACH procedure, the UE may select a RACH occasion (RO) in which to transmit a RACH preamble to the BS. A RACH occasion is an area specified in a time domain and a frequency domain that are available for the transmission of the RACH preamble. In response to the RACH preamble, the UE may receive a random access response (RAR) from the network. The RAR may indicate which preamble it is related to, a TA that should be used by the UE, a scheduling grant for sending Message 3, and a temporary cell radio network temporary identifier (TC-RNTI). Thereafter, the UE may transmit and receive additional messages (e.g., Message 3 and Message 4, respectively) to resolve any collision between two or more UEs attempting to access the network with the same preamble in the same physical PRACH resource. Once the random access (RA) procedure is completed, UE moves to connected state.

As noted above, in current 5G NR systems, a HD mode is used exclusively for RACH procedures. For example, under the HD mode, time and frequency resources of RACH occasions cannot overlap with other DL transmissions, such as synchronization signal block (SSBs), physical downlink control channel (PDCCH) transmissions, physical downlink shared channel (PDSCH) transmissions, and channel state information reference signals (CSI-RS). In other words, when transmitting a RACH preamble within an RO in current 5G NR systems, this RO must be free of other DL transmissions. Accordingly, such ROs may be known as HD ROs (e.g., ROs that may not overlap with other downlink transmissions in time). In some cases, this HD mode requirement may lead to wasted time resources as well as longer access times because the UE may have to wait a relatively long time in order to transmit a RACH preamble within an RO that does not overlap with other DL transmissions.

However, to enable more efficient use of time and frequency resources and to reduce latency associated with RACH procedures, a FD mode may be used in some cases. When performing a RACH procedure under the FD mode, ROs may overlap in time with the other DL transmissions described above. Accordingly, such ROs that overlap in time with other DL transmissions may be known as FD ROs.

Figure 5:
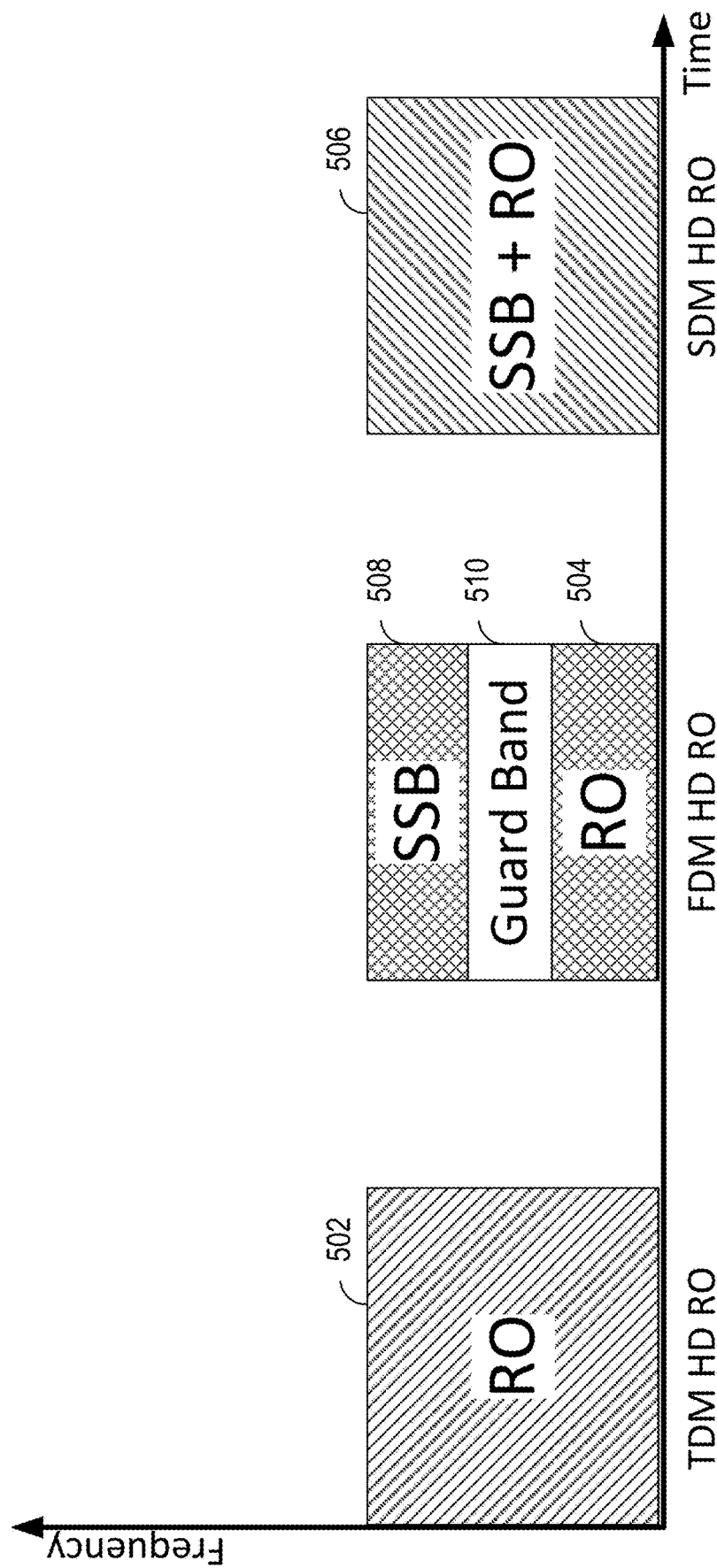
FIG. 5 illustrates the scheduling of different types of random access channel occasions.

The manner in which ROs are scheduled on time and frequency resources may be different, depending on whether the ROs are HD ROs or FD ROs, as illustrated in FIG. 5. For example, FIG. 5 illustrates the scheduling of three different ROs, an HD RO 502, an FD RO 504, and an FD RO 506.

In FIG. 5, because of the restriction that HD ROs cannot overlap with other DL transmissions in time, the HD RO 502 may be time division multiplexed with the other DL transmissions such that the HD RO 502 and the other DL transmissions may share the same frequency resources, but at different times (e.g., time resources).

In contrast, FD ROs may not have the same restriction regarding overlapping DL transmissions. Instead, FD ROs may be transmitted simultaneously with other DL transmissions. In some cases, to allow for this simultaneous transmission, FD ROs may be frequency division multiplexed or spatial division multiplexed with the other DL transmissions. In the case of frequency division multiplexing, the FD ROs may be transmitted in a first frequency band and the other DL transmission may be transmitted in a second frequency band. For example, as shown, the FD RO 504 and other DL transmissions 508 (e.g., SSB) may be transmitted on the same time resources (e.g., simultaneously in time) but on different frequency bands. That is, the FD RO 504 may be transmitted on a first frequency band while the other DL transmissions may be transmitted on a second frequency band. As shown, to reduce the chances of interference between the first frequency band and the second frequency band, the first frequency band and the second frequency band may be separated by a guard band 510.

In the case of spatial division multiplexing, the FD RO may be transmitted on the same time and frequency resources, but separated spatially from the other DL transmissions using one or more focused transmission beams. For example, as shown, the FR RO 506 is transmitted on the same time and frequency resources as the other DL transmissions (e.g., SSB). Transmission on the same time and frequency resources in this case may be facilitated by different transmission beams. For example, in some cases, the FD RO 506 may be transmitted on a first transmission beam, while the other DL transmissions may be transmitted on a second transmission beam.

As noted above, FD ROs may enable more efficient use of time and frequency resources and reduce latency associated with RACH procedures. However, there may be cases in which a UE may desire to use an HD RO instead. For example, while FD ROs may more efficiently use time and frequency resources and reduce latency, FD ROs may be subject to interference with other DL transmissions that may reduce transmission reliability. In contrast, because HD ROs do not overlap with other DL transmissions, transmission reliability on these HD ROs may be better as compared to FD ROs. In some cases, it may be beneficial for a UE to be able to select between HD ROs and FD ROs depending on different circumstances.

For example, if a UE is close to the center of a cell with good channel conditions, the UE may decide to use an FD RO to perform a RACH procedure to reduce latency associated with the RACH procedure. In other cases, if the UE is close to an edge of the cell with poorer channel conditions, the UE may instead decide to use an HD RO to perform a RACH procedure to improve the chances that RACH transmissions from the UE are properly received by a BS (e.g., since these RACH transmissions would not be overlapped by other DL transmissions during the HD RO).

However, because the other DL transmissions are usually transmitted to another device in the network, the UE may have no way of knowing whether a particular RO is overlapped with the other DL transmissions of the other device in the network. Thus, aspects of the present disclosure provide techniques for providing, by a BS, an indication to a UE of whether one or more ROs will overlap with DL transmissions in one or more periods of time. In some cases, based on the indication, the UE may select an RO of the one or more ROs based on one or more criteria involving at least one of transmission latency or transmission reliability, transmit a RACH preamble to the BS in the RO of the one or more ROs during the one or more periods of time, and perform a RACH procedure with the BS based on the received RACH preamble.

Example Method for Downlink Transmission Indication for RACH Occasions

FIG. 6 is a flow diagram illustrating example operations 600 for wireless communication. The operations 600 may be performed, for example, by a BS (e.g., such as the BS 102 in the wireless communication network 100 of FIG. 1) for providing signaling indicating an overlap of downlink transmissions with one or more random access channel occasions. The operations 600 may be implemented as software components that are executed and run on one or more processors (e.g., controller/processor 240 of FIG. 2). Further, the transmission and reception of signals by the BS in operations 600 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 600 begin, at 610, with transmitting signaling to a user equipment (UE), including an indication of whether one or more random access channel occasions (ROs) will overlap with downlink transmissions in one or more periods of time.

In block 620, the BS receives, from the UE based on the indication, a random access channel (RACH) preamble in an RO of the one or more ROs during the one or more periods of time.

In block 630, the BS performs a RACH procedure with the UE based on the received RACH preamble.

The operations 600 shown in FIG. 6 are just one example, and other methods or operations, including additional or fewer steps, are possible consistent with the present disclosure.

Figure 7:
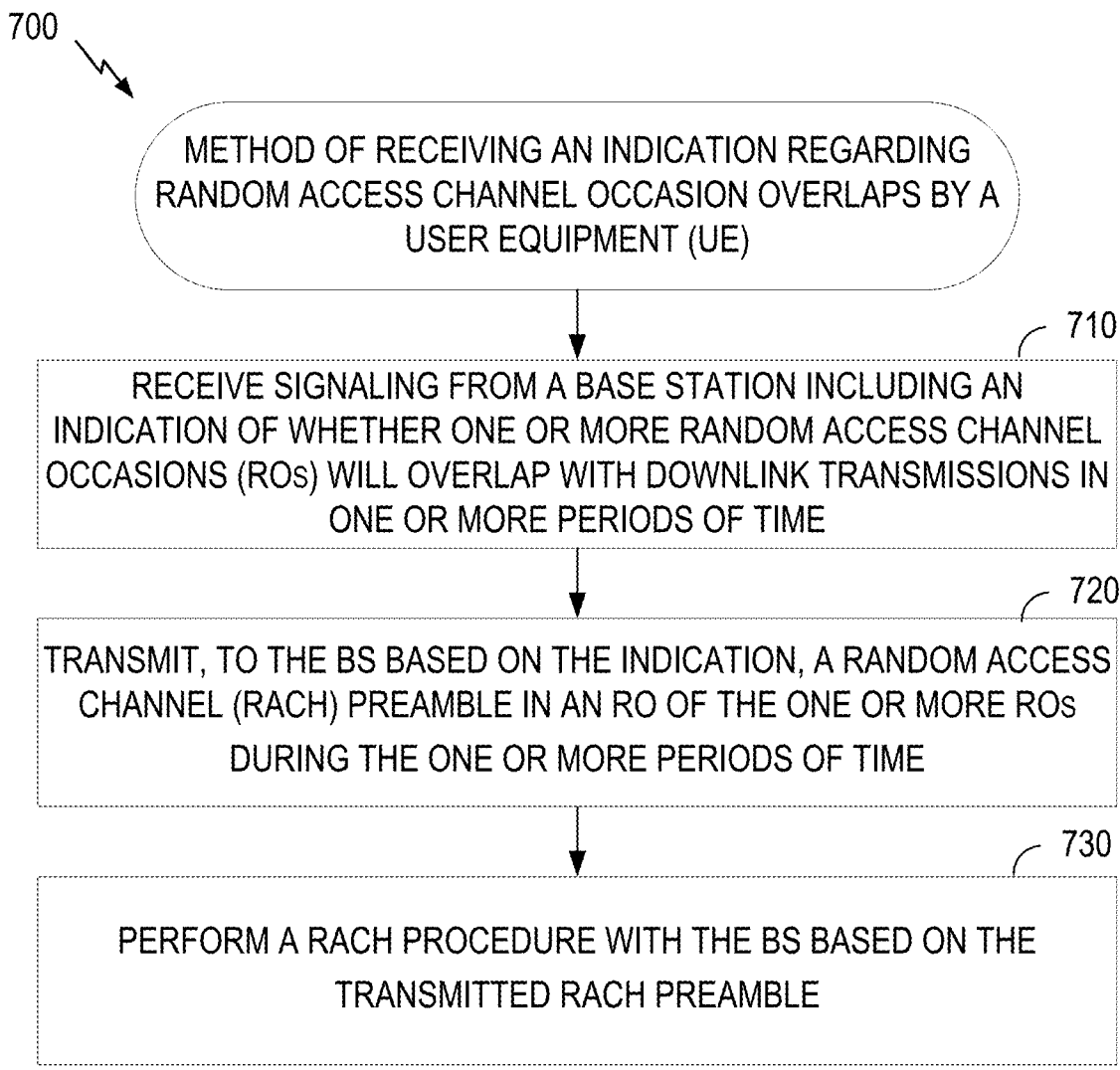
FIG. 7 is a flow diagram illustrating example operations for wireless communication by a user equipment.

FIG. 7 is a flow diagram illustrating example operations 700 for wireless communication, in accordance with certain aspects of the present disclosure. The operations 700 may be performed, for example, by a UE (e.g., such as the UE 104 in the wireless communication network 100 of FIG. 1) for receiving signaling indicating an overlap of downlink transmissions with one or more random access channel occasions. The operations 700 may be complementary to the operations 600 performed by the BS. The operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 begin, in block 710, with receiving signaling from a base station (BS) including an indication of whether one or more random access channel occasions (ROs) will overlap with downlink transmissions in one or more periods of time.

In block 720, the UE transmits, to the BS based on the indication, a random access channel (RACH) preamble in an RO of the one or more ROs during the one or more periods of time. In some cases, the UE may select the RO of the one or more ROs based on one or more criteria involving at least one of transmission latency or transmission reliability.

In block 730, the UE performs a RACH procedure with the BS based on the transmitted.

The operations 700 shown in FIG. 7 are just one example, and other methods or operations, including additional or fewer steps, are possible consistent with the present disclosure.

As noted above, aspects of the present disclosure involve techniques for providing signaling to a UE indicating indication of whether one or more ROs will overlap with downlink (DL) transmissions in one or more periods of time. In some cases, ROs may be used by the UE to perform RACH procedures for various reasons.

In some cases, the UE may use an RO to perform a RACH procedure for initial access, such as to establish an initial connection with the BS. In other cases, the UE may use an RO to perform a RACH procedure in a connected mode, for example, to update a time advance (TA) parameter or for beam failure recovery. Because the UE does not have an established connection with the BS (e.g., from which to receive dedicated signaling) when performing RACH for initial access, the indication of whether one or more ROs will overlap with the DL transmissions may be signaled in different manners.

Downlink Transmission Indication for Initial Access

For example, for initial access (e.g., which may apply to the scenario illustrated in FIG. 4B), the BS may transmit the signaling including the indication of whether the one or more ROs will overlap with the downlink transmissions in a remaining minimum system information (RMSI) broadcast signal. In some cases, the downlink transmissions associated with initial access may be downlink transmissions for a different UE in the network.

RMSI signals generally include system information, such as system information block 1 (SIB1) that includes cell selection information, public land mobile network (PLMN) information, tracking area code (TAC) information, cell identity (ID), radio access network (RAN) notification information, system information (SI) scheduling info for other system information (OSI) (e.g., SIB2-SIB9), and serving cell information. Further, RMSI signals are transmitted at a particular periodicity, such as every 160 ms. Thus, the one or more periods of time in which the signaling including the indication of whether one or more ROs will overlap with the DL transmissions may comprise time periods for transmitting and receiving RMSI broadcast signals corresponding to the RMSI periodicity.

In some cases, the signaling including the indication of whether the one or more ROs will overlap with the downlink transmissions may be transmitted in a period of time occurring before the one or more periods of time. In such cases, with respect to ROs for initial access, the signaling including the indication of whether the one or more ROs will overlap with the downlink transmissions may be transmitted in a first RMSI monitoring occasion (e.g., in a first RMSI signal transmitted in a first time period for transmitting and receiving RMSI) and may apply to ROs occurring after the first time periods for transmitting and receiving RMSI broadcast signals.

In some cases, the signaling including the indication of whether the one or more ROs will overlap with the downlink transmissions may be indicated explicitly or implicitly in the RMSI broadcast signal and may apply to different numbers of ROs. For example, in some cases, the RMSI broadcast signal may include an explicit indication of whether the one or more ROs will overlap with the downlink transmissions in a next time period per RO of the one or more ROs. In other words, in some cases, for each respective RO of the one or more ROs in the one or more periods of time, the indication includes an individual indication of whether the respective RO will overlap with the downlink transmissions in the one or more periods of time.

In some cases, the indication of whether the one or more ROs will overlap with the downlink transmissions may apply to all ROs in the one or more time periods (e.g., occurring after the time period in which the indication is received). In other words, the indication of whether the one or more ROs will overlap with the downlink transmissions is the same for all ROs of the one or more ROs in the one or more periods of time.

In some cases, the indication of whether the one or more ROs will overlap with the downlink transmissions may be indicated as a bitmap. In some cases, the bitmap may include a set of bits and each bit in the set of bits may correspond to a different RO in the one or more ROs and may indicate, for that different RO, whether that different RO will overlap with the downlink transmissions. As an example, a bit value of zero in the bitmap may indicate that a corresponding RO is an HD RO (e.g., the RO is not overlapped with downlink transmissions) while a bit value of one in the bit map may indicate that the corresponding RO is an FD RO (e.g., the RO is overlapped with downlink transmissions), or vice versa.

In other cases, the indication of whether the one or more ROs will overlap with the downlink transmissions may be provided implicitly. For example, the indication may be provided implicitly via one or more reference signal received power (RSRP) thresholds in the RMSI broadcast signal. In some cases, each RO type (e.g., FD RO and HD RO) may be associated with a different RSRP threshold. Accordingly, by indicating an RSRP threshold associated with a particular in the RMSI broadcast signal, the BS may implicitly indicate to the UE whether the RO associated with the RSRP threshold will overlap with downlink transmissions.

As an example, in some cases, a first RSRP threshold may indicate that a first respective RO of the one or more ROs will overlap with the downlink transmissions in the one or more periods of time, while a second RSRP threshold may indicate that a second respective RO of the one or more ROs will overlap with the downlink transmissions in the one or more periods of time. In other words, if the UE receives the first threshold associated with the first respective RO, the UE may implicitly determine that the first respective RO is an FD RO (e.g., an RO that is overlapped with downlink transmissions), whereas if the UE receives the second threshold associated with the second respective RO, the UE may implicitly determine that the second respective RO is an HD RO (e.g., an RO that is not overlapped with downlink transmissions).

In some cases, the one or more RSRP thresholds may be associated with different numbers of ROs. For example, the one or more RSRP threshold may include a plurality of RSRP thresholds and each different RSRP threshold in the plurality of RSRP thresholds may correspond to a different respective RO of the one or more ROs. In other words, the one or more RSRP thresholds may be indicated on a per RO basis. In other cases, the one or more RSRP thresholds may include a first RSRP threshold that applies to a subset of ROs of the one or more ROs. In other cases, the one or more RSRP thresholds may include a second RSRP threshold that applies to all ROs of the one or more ROs.

Downlink Transmission Indication for Connected Mode RACH

As noted above, the UE may use an RO to perform a RACH procedure in a connected mode, for example, to update a time advance (TA) parameter or for beam failure recovery. Transmitting the signaling in block 610 of FIG. 6 including the indication of whether the one or more ROs will overlap with the one or more downlink transmissions may be performed differently for the connected mode RACH as compared to RACH for initial access.

For example, in some cases, for connected mode RACH procedures, transmitting the signaling including the indication of whether the one or more ROs will overlap with the downlink transmissions in block 610 of FIG. 6 may include transmitting the signaling including the indication of whether the one or more ROs will overlap with the downlink transmissions explicitly via RRC signaling. In some cases, the downlink transmissions may include downlink transmissions for a different UE in the network. Further, in some cases, the one or more time periods in which the signaling including the indication regarding the overlap may include a particular time window associated with RRC signaling. A particular periodicity associated with this time window may be configurable by the BS. Further, as with initial access, the indication regarding the overlap may be transmitted in a first RRC-related time window and may apply to ROs in a second RRC-related time window occurring after the first RRC-related time window.

Additionally, the indication regarding the overlap provided in the RRC signaling may apply to different numbers of ROs. For example, the indication regarding the overlap may be provided on a per RO basis. In other words, for each RO of the one or more ROs in the one or more periods of time, the indication includes an individual indication of whether that RO will overlap with the downlink transmissions in the one or more periods of time. In other cases, the indication regarding the overlap may apply to a subset of ROs of the one or more ROs. In other words, the indication of whether the one or more ROs will overlap with the downlink transmissions applies to a subset of ROs in the one or more ROs. Further, in other cases, the indication regarding the overlap may apply to all ROs of the one or more ROs. In other words, the indication of whether the one or more ROs will overlap with the downlink transmissions is the same for all ROs of the one or more ROs in the one or more periods of time.

In some cases, the indication of whether the one or more ROs will overlap with the downlink transmissions may be provided implicitly in RRC signaling. For example, for connected mode RACH procedures, transmitting the signaling including the indication of whether the one or more ROs will overlap with the downlink transmissions in block 610 of FIG. 6 may include transmitting the signaling including the indication of whether the one or more ROs will overlap with the downlink transmissions implicitly via RRC periodic DL scheduling information. Such periodic DL scheduling information may include, in some cases, a semi-persistent scheduling (SPS) configuration, that includes resources that are semi-persistently scheduled with downlink transmissions. In some cases, the semi-persistently scheduled with downlink transmissions may be downlink transmissions associated with a different UE in the network or may be associated with the UE. In other words, the indication of whether the one or more ROs will overlap with the downlink transmissions may include SPS information that indicates one or more downlink SPS scheduling occasions that overlap the one or more ROs in the one or more time periods. In such cases, the UE may determine implicitly that the one or more ROs overlap with downlink transmissions in an SPS scheduling occasion as the SPS information indicates that such SPS scheduling occasion is reserved for downlink transmissions for the UE.

In other cases, the indication of whether the indication of whether the one or more ROs will overlap with the downlink transmissions may be provided explicitly in downlink control information (DCI) or a media access control control element (MAC-CE), or may be provided implicitly in DCI/MAC-CE scheduling information. In such cases, the one or more time periods in which the signaling including the indication regarding the overlap may include one or more slots (e.g., scheduled by the DCI/MAC-CE). Further, as with initial access, the indication regarding the overlap may be transmitted in a first slot and may apply to ROs in a second slot occurring after the first slot.

For example, transmitting the signaling including the indication of whether the one or more ROs will overlap with the downlink transmissions in block 610 of FIG. 6 may include transmitting the signaling including the indication of whether the one or more ROs will overlap with the downlink transmissions explicitly via DCI or a MAC-CE. In such cases, the downlink transmissions may include downlink transmissions may be associated with a different UE in the network. Further, the indication regarding the overlap in the DCI and/or the MAC-CE may be provided for different number of ROs. For example, the indication regarding the overlap may be provided on a per RO basis. In other words, for each RO of the one or more ROs in the one or more periods of time, the indication includes an individual indication of whether that RO will overlap with the downlink transmissions in the one or more periods of time (e.g., one or more slots).

In other cases, the indication regarding the overlap may apply to a subset of ROs of the one or more ROs. In other words, the indication of whether the one or more ROs will overlap with the downlink transmissions applies to a subset of ROs in the one or more ROs in the one or more periods of time (e.g., one or more slots). Further, in other cases, the indication regarding the overlap may apply to all ROs of the one or more ROs. In other words, the indication of whether the one or more ROs will overlap with the downlink transmissions is the same for all ROs of the one or more ROs in the one or more periods of time (e.g., one or more slots).

In some cases, as noted above, the indication of whether the indication of whether the one or more ROs will overlap with the downlink transmissions may be provided implicitly in DCI and/or MAC-CE scheduling information. For example, transmitting the signaling including the indication of whether the one or more ROs will overlap with the downlink transmissions in block 610 of FIG. 6 may include transmitting the signaling including the indication of whether the one or more ROs will overlap with the downlink transmissions implicitly via DCI or a MAC-CE. In such cases, the implicit the indication of whether the one or more ROs will overlap with the downlink transmissions may include scheduling information in one or more of the DCI or the MAC-CE that indicates scheduling of the downlink transmissions in the one or more periods of time. In some cases, the scheduling information may include a dynamic or semi-persistent DL scheduling configuration (e.g., that indicates that the downlink transmissions are overlapped in time with some ROs). In other words, the scheduling information may inform the UE of the scheduling of downlink transmissions for the UE (or from other UEs) within a particular slot. The UE may then implicitly determine from its own downlink transmission scheduling that an RO will overlap with these downlink transmissions if the RO is included within the particular slot that these downlink transmissions are located.

Figure 8:
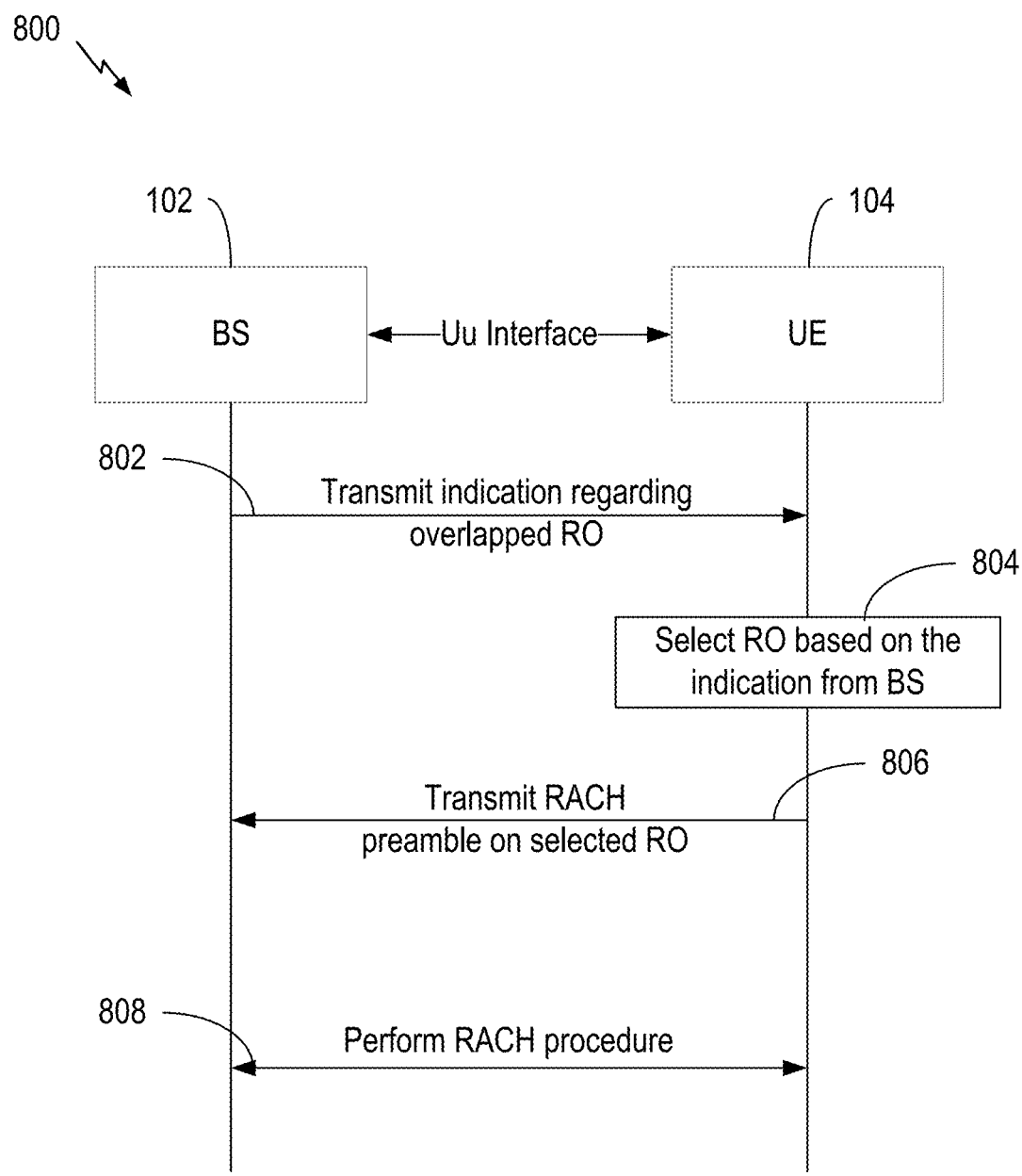
FIG. 8 is an example call flow diagram illustrating example operations for wireless communication between a user equipment and a base station.

Example Information Flow Between a Base Station and User Equipment for Indicating an Overlap Between Downlink Transmissions and ROs FIG. 8 is an example call flow diagram illustrating operations performed by a UE (e.g., such as the UE 104 in the wireless communication network 100 of FIG. 1) and a BS (e.g., such as the BS 102 in the wireless communication network 100 of FIG. 1) for providing/obtaining signaling indicating an overlap of downlink transmissions with one or more random access channel occasions.

For example, in block 802, the BS 102 transmits signaling, which may be received by the UE 104, including an indication of whether one or more ROs will overlap with downlink transmissions in one or more periods of time. In some cases, the indication of whether one or more ROs will overlap with downlink transmissions in one or more periods of time may be provided in different manners using the techniques described above. For example, in some cases, the indication may be provided in an RMSI broadcast signal for initial access RACH procedures. In other case, for connected mode RACH procedures, the indication may be provided in explicitly in RRC signaling, implicitly in periodic RRC scheduling information, explicitly in DCI/MAC-CE signaling, or implicitly in scheduling information included in the DCI/MAC-CE signaling.

In block 804, the UE 104 selects an RO of the one or more ROs in which to transmit a RACH preamble based on the indication regarding the overlap. In some cases, the UE 104 may select the RO based on one or more criteria involving at least one of transmission latency or transmission reliability. For example, if the UE 104 is close to the center of a cell with good channel conditions, the UE 104 may decide to select an FD RO that overlaps with downlink transmissions to reduce latency associated with a RACH procedure. In other cases, if the UE 104 is close to an edge of the cell with poorer channel conditions, the UE 104 may instead decide to select an HD RO to improve the chances that RACH transmissions from the UE 104 are properly received by a BS 102 (e.g., since these RACH transmissions would not be overlapped by other DL transmissions during the HD RO).

Thereafter, in block 806, the UE 104 transmits a RACH preamble, which may be received by the BS 102, in the RO of the one or more ROs during the one or more periods of time. In block 808, the BS 102 and UE 102 may perform a RACH procedure with each other. In some cases, as noted above, the RACH procedure may be performed to establish an initial connection with the BS 102, to update a time advance, for beam failure recovery and the like. Performing the RACH procedure may include, as described above, the transmission/reception of a random access response (RAR) message and the transmission of additional messages (e.g., Message 3 and Message 4) to resolve any contention in the RACH procedure.

Example Wireless Communication Devices

Figure 9:
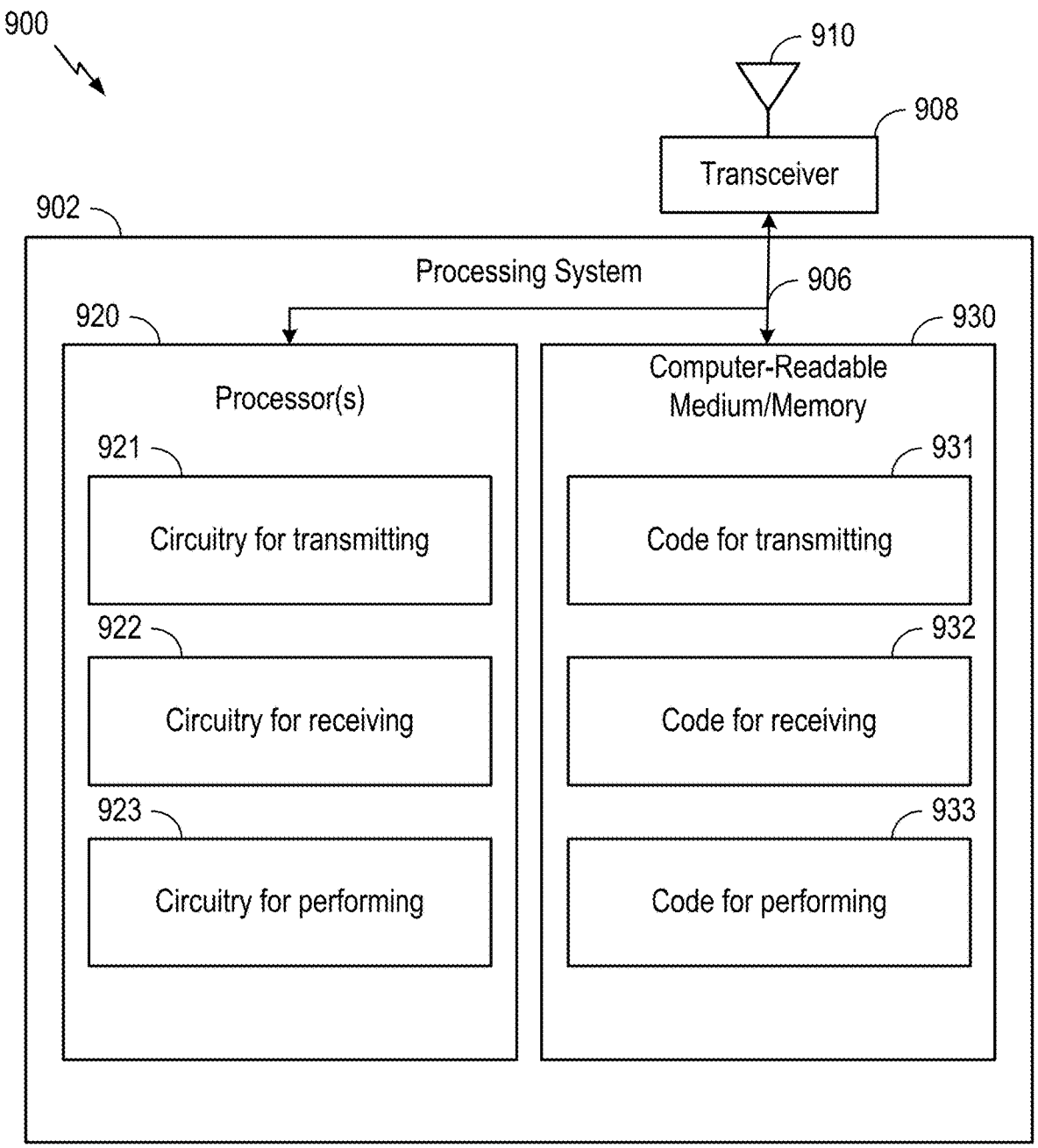
FIG. 9 illustrates an example wireless communications device configured to perform operations for the methods disclosed herein.

FIG. 9 depicts an example communications device 900 that includes various components operable, configured, or adapted to perform operations for the techniques disclosed herein, such as the operations depicted and described with respect to FIGS. 6 and/or 8. In some examples, communication device 900 may be a BS 102 as described, for example with respect to FIGS. 1 and 2.

Communications device 900 includes a processing system 902 coupled to a transceiver 908 (e.g., a transmitter and/or a receiver). Transceiver 908 is configured to transmit (or send) and receive signals for the communications device 900 via an antenna 910, such as the various signals as described herein. Processing system 902 may be configured to perform processing functions for communications device 900, including processing signals received and/or to be transmitted by communications device 900.

Processing system 902 includes one or more processors 920 coupled to a computer-readable medium/memory 930 via a bus 906. In certain aspects, computer-readable medium/memory 930 is configured to store instructions (e.g., computer-executable code) that when executed by the one or more processors 920, cause the one or more processors 920 to perform the operations illustrated in FIGS. 6 and/or 8, or other operations for performing the various techniques discussed herein for providing signaling indicating an overlap of downlink transmissions with one or more random access channel occasions.

In the depicted example, computer-readable medium/memory 930 stores code 931 for transmitting, code 932 for receiving, and code 933 for performing.

In some cases, code 931 for transmitting may include code for transmitting signaling to a user equipment (UE) including an indication of whether one or more random access channel occasions (ROs) will overlap with downlink transmissions in one or more periods of time.

In some cases, code 932 for receiving may include code for receiving, from the UE based on the indication, a random access channel (RACH) preamble in an RO of the one or more ROs during the one or more periods of time.

In some cases, code 933 for performing may include code for performing a RACH procedure with the UE based on the received RACH preamble.

In some cases, code 931 for transmitting may include code for transmitting the signaling including the indication of whether the one or more ROs will overlap with the downlink transmissions in a remaining minimum system information (RMSI) broadcast signal.

In some cases, code 931 for transmitting may include code for transmitting the signaling including the indication of whether the one or more ROs will overlap with the downlink transmissions explicitly via the RRC signaling.

In some cases, code 931 for transmitting may include code for transmitting the signaling including the indication of whether the one or more ROs will overlap with the downlink transmissions implicitly via radio resource control (RRC) periodic DL scheduling information.

In some cases, code 931 for transmitting may include code for transmitting the signaling including the indication of whether the one or more ROs will overlap with the downlink transmissions explicitly via downlink control information (DCI) or a media access control control element (MAC-CE).

In some cases, code 931 for transmitting may include code for transmitting the signaling including the indication of whether the one or more ROs will overlap with the downlink transmissions implicitly via downlink control information (DCI) or a media access control control element (MAC-CE).

In some cases, code 931 for transmitting may include code for transmitting the signaling including the indication of whether the one or more ROs will overlap with the downlink transmissions in a period of time occurring before the one or more periods of time.

In the depicted example, the one or more processors 920 include circuitry configured to implement the code stored in the computer-readable medium/memory 930, including circuitry 921 for transmitting, circuitry 922 for receiving, and circuitry 923 for performing.

In some cases, circuitry 921 for transmitting may include circuitry for transmitting signaling to a user equipment (UE) including an indication of whether one or more random access channel occasions (ROs) will overlap with downlink transmissions in one or more periods of time.

In some cases, circuitry 922 for transmitting may include circuitry for receiving, from the UE based on the indication, a random access channel (RACH) preamble in an RO of the one or more ROs during the one or more periods of time.

In some cases, circuitry 923 for transmitting may include circuitry for performing a RACH procedure with the UE based on the received RACH preamble.

In some cases, circuitry 921 for transmitting may include circuitry for transmitting the signaling including the indication of whether the one or more ROs will overlap with the downlink transmissions in a remaining minimum system information (RMSI) broadcast signal.

In some cases, circuitry 921 for transmitting may include circuitry for transmitting the signaling including the indication of whether the one or more ROs will overlap with the downlink transmissions explicitly via the RRC signaling.

In some cases, circuitry 921 for transmitting may include circuitry for transmitting the signaling including the indication of whether the one or more ROs will overlap with the downlink transmissions implicitly via radio resource control (RRC) periodic DL scheduling information.

In some cases, circuitry 921 for transmitting may include circuitry for transmitting the signaling including the indication of whether the one or more ROs will overlap with the downlink transmissions explicitly via downlink control information (DCI) or a media access control control element (MAC-CE).

In some cases, circuitry 921 for transmitting may include circuitry for transmitting the signaling including the indication of whether the one or more ROs will overlap with the downlink transmissions implicitly via downlink control information (DCI) or a media access control control element (MAC-CE).

In some cases, circuitry 921 for transmitting may include circuitry for transmitting the signaling including the indication of whether the one or more ROs will overlap with the downlink transmissions in a period of time occurring before the one or more periods of time.

Various components of communications device 900 may provide means for performing the methods described herein, including with respect to FIGS. 6 and/or 8.

In some examples, means for transmitting or transmitting (or means for outputting for transmission) may include the transceivers 232 and/or antenna(s) 234 of the BS 102 illustrated in FIG. 2 and/or transceiver 908 and antenna 910 of the communication device 900 in FIG. 9.

In some examples, means for receiving (or means for obtaining) may include the transceivers 232 and/or antenna(s) 234 of the base station illustrated in FIG. 2 and/or transceiver 908 and antenna 910 of the communication device 900 in FIG. 9.

In some examples, means for performing may include various processing system components, such as: the one or more processors 920 in FIG. 9, or aspects of the BS 102 depicted in FIG. 2, including receive processor 238, transmit processor 220, TX MIMO processor 230, and/or controller/processor 240 (including DL transmission indication component 241).

Notably, FIG. 9 is just one example, and many other examples and configurations of communication device 900 are possible.

Figure 10:
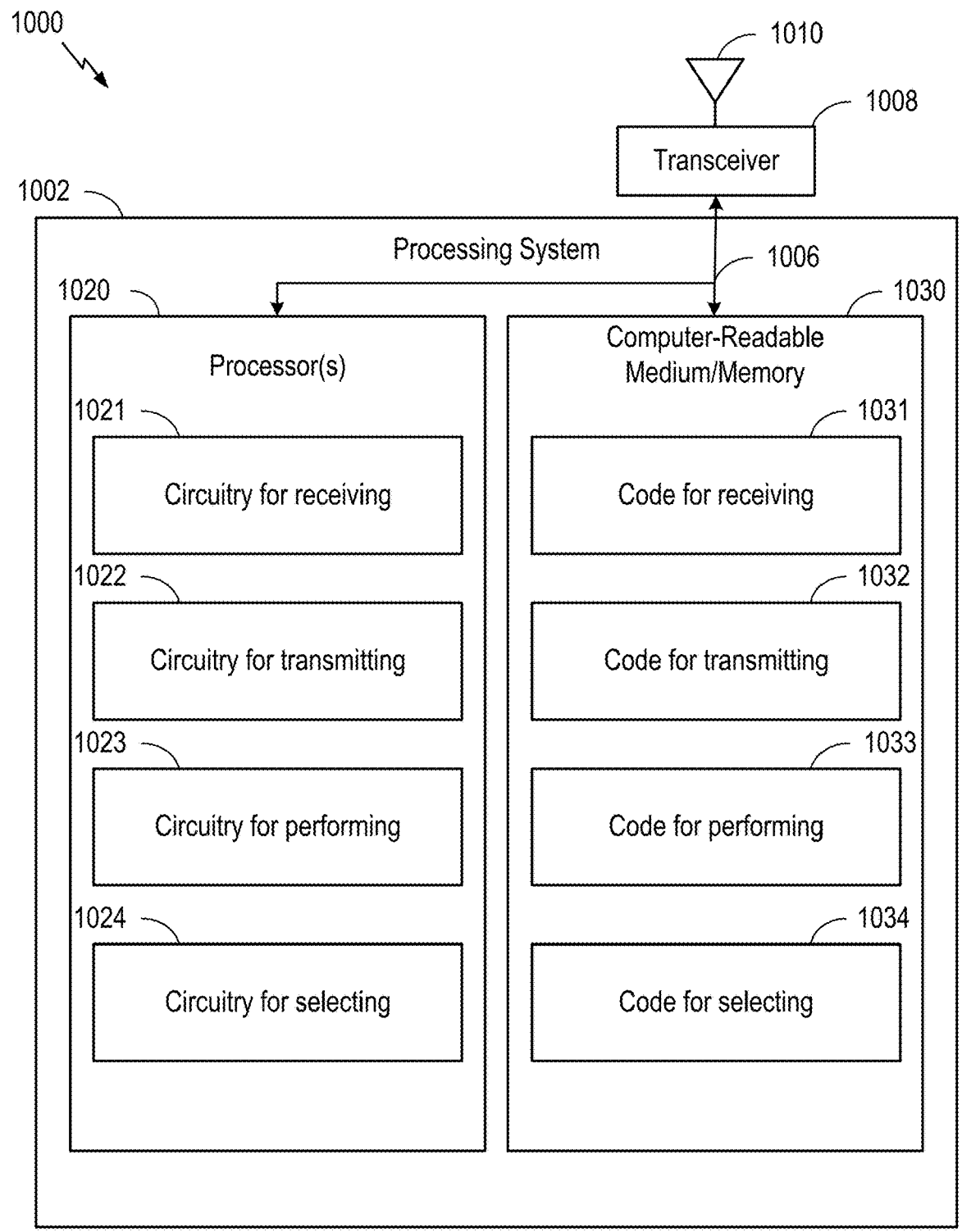
FIG. 10 illustrates an example wireless communications device configured to perform operations for the methods disclosed herein.

FIG. 10 depicts an example communications device 1000 that includes various components operable, configured, or adapted to perform operations for the techniques disclosed herein, such as the operations depicted and described with respect to FIGS. 7 and 8. In some examples, communication device 1000 may be a UE 104 as described, for example with respect to FIGS. 1 and 2.

Communications device 1000 includes a processing system 1002 coupled to a transceiver 1008 (e.g., a transmitter and/or a receiver). Transceiver 1008 is configured to transmit (or send) and receive signals for the communications device 1000 via an antenna 1010, such as the various signals as described herein. Processing system 1002 may be configured to perform processing functions for communications device 1000, including processing signals received and/or to be transmitted by communications device 1000.

Processing system 1002 includes one or more processors 1020 coupled to a computer-readable medium/memory 1030 via a bus 1006. In certain aspects, computer-readable medium/memory 1030 is configured to store instructions (e.g., computer-executable code) that when executed by the one or more processors 1020, cause the one or more processors 1020 to perform the operations illustrated in FIGS. 7 and 8, or other operations for performing the various techniques discussed herein for receiving signaling indicating an overlap of downlink transmissions with one or more random access channel occasions.

In the depicted example, computer-readable medium/memory 1030 stores code 1031 for receiving, code 1032 for transmitting, code 1033 for performing, and code 1034 for selecting.

In some cases, code 1031 for receiving may include code for receiving signaling from a base station (BS) including an indication of whether one or more random access channel occasions (ROs) will overlap with downlink transmissions in one or more periods of time.

In some cases, code 1032 for transmitting may include code transmitting, to the BS based on the indication, a random access channel (RACH) preamble in an RO of the one or more ROs during the one or more periods of time.

In some cases, code 1033 for performing may include code performing a RACH procedure with the BS based on the transmitted RACH preamble.

In some cases, code 1031 for receiving may include code for receiving the signaling including the indication of whether the one or more ROs will overlap with the downlink transmissions in a remaining minimum system information (RMSI) broadcast signal.

In some cases, code 1031 for receiving may include code for receiving the signaling including the indication of whether the one or more ROs will overlap with the downlink transmissions explicitly via the RRC signaling.

In some cases, code 1031 for receiving may include code for receiving the signaling including the indication of whether the one or more ROs will overlap with the downlink transmissions implicitly via radio resource control (RRC) periodic DL scheduling information.

In some cases, code 1031 for receiving may include code for receiving the signaling including the indication of whether the one or more ROs will overlap with the downlink transmissions explicitly via downlink control information (DCI) or a media access control control element (MAC-CE).

In some cases, code 1031 for receiving may include code for receiving the signaling including the indication of whether the one or more ROs will overlap with the downlink transmissions implicitly via downlink control information (DCI) or a media access control control element (MAC-CE).

In some cases, code 1031 for receiving may include code for receiving the signaling including the indication of whether the one or more ROs will overlap with the downlink transmissions in a period of time occurring before the one or more periods of time.

In some cases, code 1034 for selecting may include code for selecting the RO of the one or more ROs based on one or more criteria involving at least one of transmission latency or transmission reliability.

In the depicted example, the one or more processors 1020 include circuitry configured to implement the code stored in the computer-readable medium/memory 1030, including circuitry 1021 for receiving, circuitry 1022 for transmitting, circuitry 1023 for performing, and circuitry 1024 for selecting.

In some cases, circuitry 1021 for receiving may include circuitry for receiving signaling from a base station (BS) including an indication of whether one or more random access channel occasions (ROs) will overlap with downlink transmissions in one or more periods of time.

In some cases, circuitry 1022 for transmitting may include circuitry transmitting, to the BS based on the indication, a random access channel (RACH) preamble in an RO of the one or more ROs during the one or more periods of time.

In some cases, circuitry 1023 for performing may include circuitry performing a RACH procedure with the BS based on the transmitted RACH preamble.

In some cases, circuitry 1021 for receiving may include circuitry for receiving the signaling including the indication of whether the one or more ROs will overlap with the downlink transmissions in a remaining minimum system information (RMSI) broadcast signal.

In some cases, circuitry 1021 for receiving may include circuitry for receiving the signaling including the indication of whether the one or more ROs will overlap with the downlink transmissions explicitly via the RRC signaling.

In some cases, circuitry 1021 for receiving may include circuitry for receiving the signaling including the indication of whether the one or more ROs will overlap with the downlink transmissions implicitly via radio resource control (RRC) periodic DL scheduling information.

In some cases, circuitry 1021 for receiving may include circuitry for receiving the signaling including the indication of whether the one or more ROs will overlap with the downlink transmissions explicitly via downlink control information (DCI) or a media access control control element (MAC-CE).

In some cases, circuitry 1021 for receiving may include circuitry for receiving the signaling including the indication of whether the one or more ROs will overlap with the downlink transmissions implicitly via downlink control information (DCI) or a media access control control element (MAC-CE).

In some cases, circuitry 1021 for receiving may include circuitry for receiving the signaling including the indication of whether the one or more ROs will overlap with the downlink transmissions in a period of time occurring before the one or more periods of time.

In some cases, circuitry 1024 for selecting may include circuitry for selecting the RO of the one or more ROs based on one or more criteria involving at least one of transmission latency or transmission reliability.

Various components of communications device 1000 may provide means for performing the methods described herein, including with respect to FIGS. 7-8.

In some examples, means for transmitting or sending (or means for outputting for transmission) may include the transceivers 254 and/or antenna(s) 252 of the UE 104 illustrated in FIG. 2 and/or transceiver 1008 and antenna 1010 of the communication device 1000 in FIG. 10.

In some examples, means for receiving (or means for obtaining) may include the transceivers 254 and/or antenna(s) 252 of the UE 104 illustrated in FIG. 2 and/or transceiver 1008 and antenna 1010 of the communication device 1000 in FIG. 10.

In some examples, means for performing and means for selecting may include various processing system components, such as: the one or more processors 1020 in FIG. 10, or aspects of the UE 104 depicted in FIG. 2, including receive processor 258, transmit processor 264, TX MIMO processor 266, and/or controller/processor 280 (including DL transmission indication component 281).

Notably, FIG. 10 is just one example, and many other examples and configurations of communication device 1000 are possible.

Example Clauses

Implementation examples are described in the following numbered clauses:

Clause 1: A method of wireless communication by a base station (BS), comprising: transmitting signaling to a user equipment (UE) including an indication of whether one or more random access channel occasions (ROs) will overlap with downlink transmissions in one or more periods of time; receiving, from the UE based on the indication, a random access channel (RACH) preamble in an RO of the one or more ROs during the one or more periods of time; and performing a RACH procedure with the UE based on the received RACH preamble.

Clause 2: The method of Clause 1, wherein, for initial access RACH procedures, transmitting the signaling including the indication of whether the one or more ROs will overlap with the downlink transmissions comprises transmitting the signaling including the indication of whether the one or more ROs will overlap with the downlink transmissions in a remaining minimum system information (RMSI) broadcast signal.

Clause 3: The method of Clause 2, wherein the one or more periods of time comprise time periods for transmitting RMSI broadcast signals.

Clause 4: The method of any one of Clauses 1-3, wherein, for each respective RO of the one or more ROs in the one or more periods of time, the indication includes an individual indication of whether the respective RO will overlap with the downlink transmissions in the one or more periods of time.

Clause 5: The method of any one of Clauses 1-3, wherein the indication of whether the one or more ROs will overlap with the downlink transmissions is the same for all ROs of the one or more ROs in the one or more periods of time.

Clause 6: The method of any one of Clauses 1-5, wherein: the indication of whether the one or more ROs will overlap with the downlink transmissions comprises a bitmap, including a set of bits, and each bit in the set of bits corresponds to a different RO of the one or more ROs and indicates whether that different RO will overlap with the downlink transmissions.

Clause 7: The method of any one of Clauses 1-6, wherein the indication of whether the one or more ROs will overlap with the downlink transmissions comprises one or more reference signal received power (RSRP) thresholds.

Clause 8: The method of Clause 7, wherein: a first RSRP threshold indicated that a first respective RO of the one or more ROs will overlap with the downlink transmissions in the one or more periods of time; and a second RSRP threshold indicates that a second respective RO of the one or more ROs will overlap with the downlink transmissions in the one or more periods of time.

Clause 9: The method of Clause 7, wherein the one or more RSRP thresholds comprise one of: a plurality of different RSRP thresholds, wherein each different RSRP threshold of the plurality of different RSRP thresholds corresponding to a different respective RO of the one or more ROs; a first RSRP threshold that applies to a subset of ROs of the one or more ROs; or a second RSRP threshold that applies to all ROs of the one or more ROs.

Clause 10: The method of any one of Clauses 1-9, wherein the one or more periods of time comprise radio resource control (RRC) signaling time windows.

Clause 11: The method of Clause 10, wherein, for connected mode RACH procedures, transmitting the signaling including the indication of whether the one or more ROs will overlap with the downlink transmissions comprises transmitting the signaling including the indication of whether the one or more ROs will overlap with the downlink transmissions explicitly via RRC signaling.

Clause 12: The method of Clause 11, wherein, for each RO of the one or more ROs in the one or more periods of time, the indication includes an individual indication of whether that RO will overlap with the downlink transmissions in the one or more periods of time.

Clause 13: The method of Clause 11, wherein one of: the indication of whether the one or more ROs will overlap with the downlink transmissions is the same for all ROs of the one or more ROs in the one or more periods of time; or the indication of whether the one or more ROs will overlap with the downlink transmissions applies to a subset of ROs in the one or more ROs.

Clause 14: The method of Clause 10, wherein, for connected mode RACH procedures, transmitting the signaling including the indication of whether the one or more ROs will overlap with the downlink transmissions comprises transmitting the signaling including the indication of whether the one or more ROs will overlap with the downlink transmissions implicitly via RRC periodic DL scheduling information; and the indication of whether the one or more ROs will overlap with the downlink transmissions comprises semi-persistent scheduling (SPS) information indicating one or more downlink SPS scheduling occasions overlap the one or more ROs in the one or more periods of time.

Clause 15: The method of any one of Clauses 1-14, wherein, for connected mode RACH procedures, transmitting the signaling including the indication of whether the one or more ROs will overlap with the downlink transmissions comprises transmitting the signaling including the indication of whether the one or more ROs will overlap with the downlink transmissions explicitly via downlink control information (DCI) or a media access control control element (MAC-CE).

Clause 16: The method of Clause 15, wherein, for each RO of the one or more ROs in the one or more periods of time, the indication includes an individual indication of whether that RO will overlap with the downlink transmissions in the one or more periods of time.

Clause 17: The method of Clause 15, wherein one of: the indication of whether the one or more ROs will overlap with the downlink transmissions is the same for all ROs of the one or more ROs in the one or more periods of time; or the indication of whether the one or more ROs will overlap with the downlink transmissions applies to a subset of ROs in the one or more ROs Clause 18: The method of any one of Clauses 1-14, wherein, for connected mode RACH procedures, transmitting the signaling including the indication of whether the one or more ROs will overlap with the downlink transmissions comprises transmitting the signaling including the indication of whether the one or more ROs will overlap with the downlink transmissions implicitly via downlink control information (DCI) or a media access control control element (MAC-CE); and the indication of whether the one or more ROs will overlap with the downlink transmissions comprises scheduling information in one or more of the DCI or the MAC-CE that indicates scheduling of the downlink transmissions in the one or more periods of time.

Clause 19: The method of any one of Clauses 1-18, wherein transmitting the signaling including the indication of whether the one or more ROs will overlap with the downlink transmissions comprises transmitting the signaling including the indication of whether the one or more ROs will overlap with the downlink transmissions in a period of time occurring before the one or more periods of time.

Clause 20: The method of Clause 1, wherein: the RO of the one or more ROs comprises a full-duplex RO when the RO overlaps with the downlink transmissions; and the RO comprises a half-duplex RO when the RO does not overlap with the downlink transmissions.

Clause 21: A method of wireless communication by a user equipment (UE), comprising: receiving signaling from a base station (BS) including an indication of whether one or more random access channel occasions (ROs) will overlap with downlink transmissions in one or more periods of time; transmitting, to the BS based on the indication, a random access channel (RACH) preamble in an RO of the one or more ROs during the one or more periods of time; and performing a RACH procedure with the BS based on the transmitted RACH preamble.

Clause 22: The method of Clause 21, wherein, for initial access RACH procedures, receiving the signaling including the indication of whether the one or more ROs will overlap with the downlink transmissions comprises receiving the signaling including the indication of whether the one or more ROs will overlap with the downlink transmissions in a remaining minimum system information (RMSI) broadcast signal.

Clause 23: The method of Clause 22, wherein the one or more periods of time comprise time periods for receiving RMSI broadcast signals.

Clause 24: The method of any one of Clauses 21-23, wherein, for each respective RO of the one or more ROs in the one or more periods of time, the indication includes an individual indication of whether the respective RO will overlap with the downlink transmissions in the one or more periods of time.

Clause 25: The method of any one of Clauses 21-23, wherein the indication of whether the one or more ROs will overlap with the downlink transmissions is the same for all ROs of the one or more ROs in the one or more periods of time.

Clause 26: The method of any one of Clauses 21-25, wherein: the indication of whether the one or more ROs will overlap with the downlink transmissions comprises a bitmap, including a set of bits, and each bit in the set of bits corresponds to a different RO of the one or more ROs and indicates whether that different RO will overlap with the downlink transmissions.

Clause 27: The method of any one of Clauses 21-26, wherein the indication of whether the one or more ROs will overlap with the downlink transmissions comprises one or more reference signal received power (RSRP) thresholds.

Clause 28: The method of Clause 27, wherein: a first RSRP threshold indicated that a first respective RO of the one or more ROs will overlap with the downlink transmissions in the one or more periods of time; and a second RSRP threshold indicates that a second respective RO of the one or more ROs will overlap with the downlink transmissions in the one or more periods of time.

Clause 29: The method of Clause 27, wherein the one or more RSRP thresholds comprise one of: a plurality of different RSRP thresholds, wherein each different RSRP threshold of the plurality of different threshold corresponding to a different respective RO of the one or more ROs; a first RSRP threshold that applies to a subset of ROs of the one or more ROs; or a second RSRP threshold that applies to all ROs of the one or more ROs.

Clause 30: The method of any one of Clauses 21-29, wherein the one or more periods of time comprise radio resource control (RRC) signaling time windows.

Clause 31: The method of Clause 30, wherein, for connected mode RACH procedures, receiving the signaling including the indication of whether the one or more ROs will overlap with the downlink transmissions comprises receiving the signaling including the indication of whether the one or more ROs will overlap with the downlink transmissions explicitly via RRC signaling.

Clause 32: The method of Clause 31, wherein, for each RO of the one or more ROs in the one or more periods of time, the indication includes an individual indication of whether that RO will overlap with the downlink transmissions in the one or more periods of time.

Clause 33: The method of Clause 31, wherein one of: the indication of whether the one or more ROs will overlap with the downlink transmissions is the same for all ROs of the one or more ROs in the one or more periods of time; or the indication of whether the one or more ROs will overlap with the downlink transmissions applies to a subset of ROs in the one or more ROs.

Clause 34: The method of Clause 30, wherein, for connected mode RACH procedures, receiving the signaling including the indication of whether the one or more ROs will overlap with the downlink transmissions comprises receiving the signaling including the indication of whether the one or more ROs will overlap with the downlink transmissions implicitly via RRC periodic DL scheduling information; and the indication of whether the one or more ROs will overlap with the downlink transmissions comprises semi-persistent scheduling (SPS) information indicating one or more downlink SPS scheduling occasions overlap the one or more ROs in the one or more periods of time.

Clause 35: The method of any one of Clauses 21-34, wherein, for connected mode RACH procedures, receiving the signaling including the indication of whether the one or more ROs will overlap with the downlink transmissions comprises receiving the signaling including the indication of whether the one or more ROs will overlap with the downlink transmissions explicitly via downlink control information (DCI) or a media access control control element (MAC-CE).

Clause 36: The method of Clause 35, wherein, for each RO of the one or more ROs in the one or more periods of time, the indication includes an individual indication of whether that RO will overlap with the downlink transmissions in the one or more periods of time.

Clause 37: The method of Clause 35, wherein one of: the indication of whether the one or more ROs will overlap with the downlink transmissions is the same for all ROs of the one or more ROs in the one or more periods of time; or the indication of whether the one or more ROs will overlap with the downlink transmissions applies to a subset of ROs in the one or more ROs Clause 38: The method of any one of Clauses 21-34, wherein, for connected mode RACH procedures, receiving the signaling including the indication of whether the one or more ROs will overlap with the downlink transmissions comprises receiving the signaling including the indication of whether the one or more ROs will overlap with the downlink transmissions implicitly via downlink control information (DCI) or a media access control control element (MAC-CE); and the indication of whether the one or more ROs will overlap with the downlink transmissions comprises scheduling information in one or more of the DCI or the MAC-CE that indicates scheduling of the downlink transmissions in the one or more periods of time.

Clause 39: The method of any one of Clauses 21-38, wherein receiving the signaling including the indication of whether the one or more ROs will overlap with the downlink transmissions comprises receiving the signaling including the indication of whether the one or more ROs will overlap with the downlink transmissions in a period of time occurring before the one or more periods of time.

Clause 40: The method of any one of Clauses 21-39, wherein: the RO of the one or more ROs comprises a full-duplex RO when the RO overlaps with the downlink transmissions; and the RO comprises a half-duplex RO when the RO does not overlap with the downlink transmissions.

Clause 41: The method of any one of Clauses 21-40, further comprising selecting the RO of the one or more ROs based on one or more criteria involving at least one of transmission latency or transmission reliability.

Clause 42: An apparatus, comprising: a memory comprising executable instructions; one or more processors configured to execute the executable instructions and cause the apparatus to perform a method in accordance with any one of Clauses 1-41.

Clause 43: An apparatus, comprising means for performing a method in accordance with any one of Clauses 1-41.

Clause 44: A non-transitory computer-readable medium comprising executable instructions that, when executed by one or more processors of an apparatus, cause the apparatus to perform a method in accordance with any one of Clauses 1-41.

Clause 45: A computer program product embodied on a computer-readable storage medium comprising code for performing a method in accordance with any one of Clauses 1-41.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS or a home BS.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with core network 190 through second backhaul links 184. Base stations 102 may communicate directly or indirectly (e.g., through the EPC 160 or core network 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as BS 180 may operate in a traditional sub-6 GHz spectrum, in millimeter wave (mmWave) frequencies, and/or near mmWave frequencies in communication with the UE 104. When the BS 180 operates in mmWave or near mmWave frequencies, the BS 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

Core network 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and core network 190. Generally, AMF 192 provides QoS flow and session management.

All user Internet protocol (IP) packets are transferred through UPF 195, which is connected to the IP Services 197, and which provides UE IP address allocation as well as other functions for core network 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A, 3B, 3C, and 3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (µ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and 2µ slots/subframe. The subcarrier spacing and symbol length/duration are a function of the numerology. The subcarrier spacing may be equal to $2^{\mu} \times 15$ kHz, where is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 3A, 3B, 3C, and 3D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of downlink transmission indication for random access channel occasions (ROs) in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication by a user equipment (UE), comprising:
    receiving signaling from a base station (BS) including an indication of whether one or more random access channel occasions (ROs) will overlap with downlink transmissions in one or more periods of time;
    transmitting, to the BS based on the indication, a random access channel (RACH) preamble in an RO of the one or more ROs during the one or more periods of time, wherein:
        the RO of the one or more ROs comprises a full-duplex RO when the RO overlaps with the downlink transmissions; and
        the RO comprises a half-duplex RO when the RO does not overlap with the downlink transmissions; and
    performing a RACH procedure with the BS based on the transmitted RACH preamble.

2. The method of claim 1, wherein, for initial access RACH procedures, receiving the signaling including the indication of whether the one or more ROs will overlap with the downlink transmissions comprises receiving the signaling including the indication of whether the one or more ROs will overlap with the downlink transmissions in a remaining minimum system information (RMSI) broadcast signal.

3. The method of claim 2, wherein the one or more periods of time comprise time periods for receiving RMSI broadcast signals.

4. The method of claim 1, wherein, for each respective RO of the one or more ROs in the one or more periods of time, the indication includes an individual indication of whether the respective RO will overlap with the downlink transmissions in the one or more periods of time.

5. The method of claim 1, wherein the indication of whether the one or more ROs will overlap with the downlink transmissions is the same for all ROs of the one or more ROs in the one or more periods of time.

6. The method of claim 1, wherein:
    the indication of whether the one or more ROs will overlap with the downlink transmissions comprises a bitmap, including a set of bits, and
    each bit in the set of bits corresponds to a different RO of the one or more ROs and indicates whether that different RO will overlap with the downlink transmissions.

7. The method of claim 1, wherein the indication of whether the one or more ROs will overlap with the downlink transmissions comprises one or more reference signal received power (RSRP) thresholds.

8. The method of claim 7, wherein:
    a first RSRP threshold indicated that a first respective RO of the one or more ROs will overlap with the downlink transmissions in the one or more periods of time; and
    a second RSRP threshold indicates that a second respective RO of the one or more ROs will overlap with the downlink transmissions in the one or more periods of time.

9. The method of claim 7, wherein the one or more RSRP thresholds comprise one of:
    a plurality of different RSRP thresholds, wherein each different RSRP threshold of the plurality of different RSRP thresholds corresponds to a different respective RO of the one or more ROs;
    a first RSRP threshold that applies to a subset of ROs of the one or more ROs; or
    a second RSRP threshold that applies to all ROs of the one or more ROs.

10. The method of claim 1, wherein, for connected mode RACH procedures, receiving the signaling including the indication of whether the one or more ROs will overlap with the downlink transmissions comprises receiving the signaling including the indication of whether the one or more ROs will overlap with the downlink transmissions explicitly via RRC signaling.

11. The method of claim 10, wherein, for each RO of the one or more ROs in the one or more periods of time, the indication includes an individual indication of whether that RO will overlap with the downlink transmissions in the one or more periods of time.

12. The method of claim 10, wherein one of:
the indication of whether the one or more ROs will overlap with the downlink transmissions is the same for all ROs of the one or more ROs in the one or more periods of time; or
the indication of whether the one or more ROs will overlap with the downlink transmissions applies to a subset of ROs in the one or more ROs.

13. The method of claim 10, wherein the one or more periods of time comprise RRC signaling time windows.

14. The method of claim 1, wherein:
for connected mode RACH procedures, receiving the signaling including the indication of whether the one or more ROs will overlap with the downlink transmissions comprises receiving the signaling including the indication of whether the one or more ROs will overlap with the downlink transmissions implicitly via radio resource control (RRC) periodic DL scheduling information; and
the indication of whether the one or more ROs will overlap with the downlink transmissions comprises semi-persistent scheduling (SPS) information indicating one or more downlink SPS scheduling occasions overlap the one or more ROs in the one or more periods of time.

15. The method of claim 1, wherein, for connected mode RACH procedures, receiving the signaling including the indication of whether the one or more ROs will overlap with the downlink transmissions comprises receiving the signaling including the indication of whether the one or more ROs will overlap with the downlink transmissions explicitly via downlink control information (DCI) or a media access control control element (MAC-CE).

16. The method of claim 15, wherein, for each RO of the one or more ROs in the one or more periods of time, the indication includes an individual indication of whether that RO will overlap with the downlink transmissions in the one or more periods of time.

17. The method of claim 15, wherein one of:
the indication of whether the one or more ROs will overlap with the downlink transmissions is the same for all ROs of the one or more ROs in the one or more periods of time; or
the indication of whether the one or more ROs will overlap with the downlink transmissions applies to a subset of ROs in the one or more ROs.

18. The method of claim 1, wherein:
for connected mode RACH procedures, receiving the signaling including the indication of whether the one or more ROs will overlap with the downlink transmissions comprises receiving the signaling including the indication of whether the one or more ROs will overlap with the downlink transmissions implicitly via downlink control information (DCI) or a media access control element (MAC-CE); and
the indication of whether the one or more ROs will overlap with the downlink transmissions comprises scheduling information in at least one of the DCI or the MAC-CE that indicates scheduling of the downlink transmissions in the one or more periods of time.

19. The method of claim 1, wherein receiving the signaling including the indication of whether the one or more ROs will overlap with the downlink transmissions comprises receiving the signaling including the indication of whether the one or more ROs will overlap with the downlink transmissions in a period of time occurring before the one or more periods of time.

20. The method of claim 1, further comprising selecting the RO of the one or more ROs based on one or more criteria involving at least one of transmission latency or transmission reliability.

21. A method of wireless communication by a base station (BS), comprising:
transmitting signaling to a user equipment (UE) including an indication of whether one or more random access channel occasions (ROs) will overlap with downlink transmissions in one or more periods of time;
receiving, from the UE based on the indication, a random access channel (RACH) preamble in an RO of the one or more ROs during the one or more periods of time, wherein:
the RO of the one or more ROs comprises a full-duplex RO when the RO overlaps with the downlink transmissions; and
the RO comprises a half-duplex RO when the RO does not overlap with the downlink transmissions; and
performing a RACH procedure with the UE based on the received RACH preamble.

22. The method of claim 21, wherein, for initial access RACH procedures, transmitting the signaling including the indication of whether the one or more ROs will overlap with the downlink transmissions comprises transmitting the signaling including the indication of whether the one or more ROs will overlap with the downlink transmissions in a remaining minimum system information (RMSI) broadcast signal.

23. The method of claim 21, wherein the indication of whether the one or more ROs will overlap with the downlink transmissions comprises one or more reference signal received power (RSRP) thresholds.

24. The method of claim 21, wherein, for connected mode RACH procedures, transmitting the signaling including the indication of whether the one or more ROs will overlap with the downlink transmissions comprises transmitting the signaling including the indication of whether the one or more ROs will overlap with the downlink transmissions explicitly via RRC signaling.

25. The method of claim 21, wherein:
for connected mode RACH procedures, transmitting the signaling including the indication of whether the one or more ROs will overlap with the downlink transmissions comprises transmitting the signaling including the indication of whether the one or more ROs will overlap with the downlink transmissions implicitly via radio resource control (RRC) periodic DL scheduling information; and
the indication of whether the one or more ROs will overlap with the downlink transmissions comprises semi-persistent scheduling (SPS) information indicating one or more downlink SPS scheduling occasions overlap the one or more ROs in the one or more periods of time.

26. The method of claim 21, wherein, for connected mode RACH procedures, transmitting the signaling including the indication of whether the one or more ROs will overlap with the downlink transmissions comprises transmitting the signaling including the indication of whether the one or more ROs will overlap with the downlink transmissions explicitly via downlink control information (DCI) or a media access control control element (MAC-CE).

27. The method of claim 21, wherein:
  for connected mode RACH procedures, transmitting the signaling including the indication of whether the one or more ROs will overlap with the downlink transmissions comprises transmitting the signaling including the indication of whether the one or more ROs will overlap with the downlink transmissions implicitly via downlink control information (DCI) or a media access control control element (MAC-CE); and
  the indication of whether the one or more ROs will overlap with the downlink transmissions comprises scheduling information in at least one of the DCI or the MAC-CE that indicates scheduling of the downlink transmissions in the one or more periods of time.

28. An apparatus for wireless communication by a user equipment (UE), comprising:
  a memory comprising executable instructions; and
  a processor configured to execute the executable instructions and cause the apparatus to:
    receive signaling from a base station (BS) including an indication of whether one or more random access channel occasions (ROs) will overlap with downlink transmissions in one or more periods of time;
    transmit, to the BS based on the indication, a random access channel (RACH) preamble in an RO of the one or more ROs during the one or more periods of time, wherein:
      the RO of the one or more ROs comprises a full-duplex RO when the RO overlaps with the downlink transmissions; and
      the RO comprises a half-duplex RO when the RO does not overlap with the downlink transmissions; and
    perform a RACH procedure with the BS based on the transmitted RACH preamble.

29. An apparatus for wireless communication by a base station (BS), comprising:
  a memory comprising executable instructions; and
  a processor configured to execute the executable instructions and cause the apparatus to:
    transmit signaling to a user equipment (UE) including an indication of whether one or more random access channel occasions (ROs) will overlap with downlink transmissions in one or more periods of time;
    receive, from the UE based on the indication, a random access channel (RACH) preamble in an RO of the one or more ROs during the one or more periods of time, wherein:
      the RO of the one or more ROs comprises a full-duplex RO when the RO overlaps with the downlink transmissions; and
      the RO comprises a half-duplex RO when the RO does not overlap with the downlink transmissions; and
    perform a RACH procedure with the UE based on the received RACH preamble.

* * * * *